United States Patent
An et al.

(10) Patent No.: US 9,879,902 B2
(45) Date of Patent: Jan. 30, 2018

(54) REFRIGERATOR

(71) Applicant: SAMSUNG ELECTRONICS CO., LTD., Suwon-si, Gyeonggi-do (KR)

(72) Inventors: Jae Koog An, Gwangju (KR); Byung Mo Yu, Suwon-si (KR)

(73) Assignee: SAMSUNG ELECTRONICS CO., LTD., Suwon (KR)

( * ) Notice: Subject to any disclaimer, the term of this patent is extended or adjusted under 35 U.S.C. 154(b) by 69 days.

(21) Appl. No.: 15/044,485

(22) Filed: Feb. 16, 2016

(65) Prior Publication Data

US 2016/0238305 A1    Aug. 18, 2016

(30) Foreign Application Priority Data

Feb. 17, 2015    (KR) .................. 10-2015-0024137

(51) Int. Cl.
  *B01F 3/04*    (2006.01)
  *A23L 2/00*    (2006.01)
  *F25D 23/12*    (2006.01)

(52) U.S. Cl.
  CPC ............ *F25D 23/12* (2013.01); *A23L 2/00* (2013.01); *B01F 3/04106* (2013.01); *B01F 3/04787* (2013.01); *B01F 3/04794* (2013.01); *B01F 3/04808* (2013.01); *F25D 23/126* (2013.01)

(58) Field of Classification Search
  CPC . A23L 2/00; F25D 31/002; B01F 3/04; B01F 3/04099; B01F 3/04787; B01F 3/04808
  USPC ........................................ 261/76; 99/323.1
  See application file for complete search history.

(56) References Cited

U.S. PATENT DOCUMENTS

| | | | |
|---|---|---|---|
| 2,503,376 A * | 4/1950 | Burgess | B67D 1/0406 137/122 |
| 4,323,090 A | 4/1982 | Magi | |
| 5,118,010 A * | 6/1992 | Jeans | B67D 1/0052 116/DIG. 32 |
| 6,405,900 B1 | 6/2002 | Kown | |
| 6,832,634 B1 | 12/2004 | Chantalat | |
| 9,381,475 B2 * | 7/2016 | An | F25D 23/126 |
| 2006/0086136 A1 | 4/2006 | Maritan et al. | |

FOREIGN PATENT DOCUMENTS

| | | |
|---|---|---|
| CN | 103423936 | 12/2013 |
| CN | 103876625 | 6/2014 |
| CN | 105371581 | 3/2016 |

(Continued)

OTHER PUBLICATIONS

Extended European Search Report dated Jul. 8, 2016 in corresponding European Patent Application No. 16155985.1.

(Continued)

*Primary Examiner* — Robert A Hopkins
(74) *Attorney, Agent, or Firm* — Staas & Halsey LLP

(57) ABSTRACT

Disclosed herein is a refrigerator which includes a carbonated water production assembly, wherein the carbonated water production assembly includes a structure in which purified water or carbonated water which overflow from a carbonated water container in which the carbonated water is produced is discharged by detouring. Through this, cleanliness of the carbonated water container may be improved, and safety may be improved during the carbonated water production.

20 Claims, 26 Drawing Sheets

(56) References Cited

FOREIGN PATENT DOCUMENTS

| | | |
|---|---|---|
| EP | 1 580 502 A1 | 9/2005 |
| EP | 1614986 | 1/2006 |
| KR | 10-2006-0000202 | 1/2006 |
| KR | 10-2014-0108092 | 9/2014 |
| WO | WO 2012/162762 A1 | 12/2012 |
| WO | WO 2013/124236 A1 | 8/2013 |

OTHER PUBLICATIONS

Chinese Office Action dated Nov. 3, 2017 in Chinese Patent Application No. 201610090357.2.

* cited by examiner

REFRIGERATOR

CROSS-REFERENCE TO RELATED APPLICATION

This application claims the benefit of Korean Patent Application No. 2015-0024137, filed on Feb. 17, 2015 in the Korean Intellectual Property Office, the disclosure of which is incorporated herein by reference.

BACKGROUND

1. Field

The present invention relates to a refrigerator, and more particularly, to a refrigerator having a carbonated water production function.

2. Description of the Related Art

In general, refrigerators are appliances which include storage chambers which store food and cooling air supply units which supply cooling air to the storage chambers and thus maintain the freshness of the stored food. The refrigerators may include ice-making devices which make ice and dispensers from which users extract water or the ice from the outside of the refrigerator without opening doors to meet the requirement of the users.

The Refrigerator may further include carbonated water production devices which generate carbonated water. The carbonated water production device includes a carbon dioxide cylinder in which a high pressure carbon dioxide gas is stored and is provided to produce the carbonated water by mixing with purified water.

For producing the carbonated water, a method has been used where a carbonated water tank is separately provided to which water and carbon dioxide is supplied to make the carbonated water to be supplied through a dispenser.

However, in this case, many sensors were required to sense a pressure, water level, etc. in the carbonated water tank, and because the volume of elements thereof so big that there was problem with the refrigerator becoming unnecessarily big. In addition, there was a problem due to a concern for the carbonated water to be spoiled when kept in the carbonated water tank for a long time.

SUMMARY

Therefore, it is one aspect of the present invention to provide a refrigerator which easily produces carbonated water.

In addition, a refrigerator is provided to improve safety for producing carbonated water.

In addition, a refrigerator is provided to improve cleanness for producing carbonated water.

Additional aspects of the invention will be set forth in part in the description which follows and, in part, will be obvious from the description or may be learned by practice of the invention.

In accordance with one aspect of the present invention, a refrigerator includes:

a refrigerator main body including a cooling space; and a carbonated water production assembly provided in the refrigerator main body, wherein the carbonated water production assembly includes: a production module; a carbon dioxide supply module connected to the production module to supply carbon dioxide; a carbonated water container which is provided to be detachable from the production module, and in which carbonated water is produced; and a discharge module provided to discharge a discharging fluid which overflows from the carbonated water container from the carbonated water container.

The carbonated water container may include an opening having one open side, and the opening may be sealed by the production module when the carbonated water container is installed in the production module.

The carbonated water container may be configured to be sealed by the production module, and the carbonated water production assembly may further includes at least one relief valve which has one side facing the opening of the carbonated water container and discharges a discharging fluid which overflows from the carbonated water container to the discharge module.

The relief valve may be provided to communicate with an inner portion of the carbonated water container when the carbonated water container is installed in the production module.

The discharge module may include: a discharge module body provided to surround a discharge portion of the relief valve; and a discharge hole which discharges carbonated water discharged to the discharge module body to an outside of the discharge module.

The carbonated water production assembly may include a dispenser housing forming a water dispensing space exposed to the outside, and the discharge hole may be provided facing a rear surface of the dispenser housing.

The discharge module may further include a discharge bottom portion provided at a lower portion of a discharge module body, and the discharge bottom portion may be provided to be inclined toward the discharge hole.

The discharge module may further include a plurality of discharge ribs which forms a discharge flow path such that a discharging fluid discharged from the relief valve flows to the discharge bottom portion.

The discharge module may further include a discharging space connected to a discharge portion of the relief valve in the discharge module body, and the discharging space and the discharge bottom portion may be connected to each other through the discharge flow path.

The plurality of discharge ribs may be disposed to alternately intersect with each other.

The production module may include an installation body provided such that the carbonated water container is installable.

The carbonated water production assembly may include a water dispensing space which is exposed to the outside, and in which the carbonated water container is accommodated, and the production module may further include an installation body in which the carbonated water container is installable, and which is exposed in the water dispensing space.

The production module may further include a packing portion which seals the opening when the carbonated water container is installed in the production module.

The carbonated water production assembly may include an overflow sensor which is provided to be inserted into the opening when the carbonated water container is coupled to the production module, and senses overflow of carbonated water in the carbonated water container.

The discharge module may be provided such that a discharging fluid which overflows from the carbonated water container is discharged from the carbonated water container by detouring.

In accordance with another aspect of the present invention, a refrigerator includes: a refrigerator main body including a cooling space; and a carbonated water production assembly provided in the refrigerator main body, wherein the carbonated water production assembly includes: a water dispensing space exposed at the refrigerator main body to the outside; a production module having one side exposed in the water dispensing space; a carbon dioxide supply module connected to the production module to supply carbon dioxide; a carbonated water container which is detachably provided at one side of the exposed production module, and in which carbonated water is produced; at least one relief valve provided in the production module to discharge carbonated water which overflows from the carbonated water container; and a discharge module provided to discharge carbonated water discharged through the at least one relief valve by detouring the carbonated water container.

The discharge module may include: a discharge module body provided to surround a discharge portion of the relief valve; and a discharge hole provided in the discharge module body to discharge carbonated water discharged from the relief valve to outside of the discharge module body.

The carbonated water production assembly may include a dispenser housing forming a water dispensing space exposed to an outside of the refrigerator main body, and the discharge hole may be provided facing a rear surface of the dispenser housing.

The discharge module body may include a discharge bottom portion forming a lower portion, and the discharge bottom portion may be provided to be inclined toward the discharge hole.

The discharge module may further include a plurality of discharge ribs which are provided in the discharge module body, and form a discharge flow path such that carbonated water discharged from the relief valve flows to the discharge bottom portion.

The discharge module may include a discharging space connected to the discharge portion of the relief valve in the discharge module body, and the discharging space and the discharge bottom portion may be connected to each other through the discharge flow path.

The plurality of discharge ribs may be disposed to be alternating with each other.

In accordance with still another aspect of the present invention, a refrigerator includes: a refrigerator main body including a cooling space; and a carbonated water production assembly provided in the refrigerator main body, wherein the carbonated water production assembly includes: a water dispensing space provided to be exposed at the refrigerator main body to the outside; a production module having one side exposed in the water dispensing space; a purified water module configured to supply purified water and a carbon dioxide supply module configured to supply carbon dioxide, which are connected to the production module; a carbonated water container which is detachably provided at one side of the exposed production module, receives purified water from the purified water module, and receives carbon dioxide from the carbon dioxide supply module, and in which carbonated water is produced; and at least one relief valve provided such that a discharging fluid such as purified water, carbon dioxide, and carbonated water which overflow from the carbonated water container is discharged.

In accordance with yet another aspect of the present invention, a refrigerator includes: a refrigerator main body including a cooling space; and a carbonated water production assembly provided in the refrigerator main body, wherein the carbonated water production assembly includes: a water dispensing space provided to be exposed at the refrigerator main body to the outside; a production module having one side exposed in the water dispensing space; a carbon dioxide supply module connected to the production module to supply carbon dioxide; a carbonated water container which is detachably provided at one side of the exposed production module, and in which carbonated water is produced; and a relief valve provided to be openable/closeable to adjust an amount of carbon dioxide supplied to the carbonated water container.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Embodiments described in this specification and configurations illustrated in drawings are only exemplary examples of the disclosed invention, and the invention covers various modifications that can substitute for the embodiments herein and drawings at the time of filing of this application.

In addition, the same reference number refers to a part or component substantially performing the same function.

In addition, the terms used in the present specification are merely used to describe embodiments and are not intended to limit and/or restrict embodiments. An expression used in the singular encompasses the expression in the plural unless it has a clearly different meaning in the context. In the present specification, the terms such as "including," "having," and "comprising" are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

In addition, although the terms "first," "second," etc. may be used herein to describe various elements, these elements should not be limited by these terms. These terms are only used to distinguish one element from another. For example, a first element could be termed a second element, and, similarly, a second element could be termed a first element without departing from the scope of the present invention. As used herein, the term "and/or" includes any and all combinations of one or more of the associated listed items.

Hereinafter, embodiments of the present invention will be described in detail.

Figure 1:
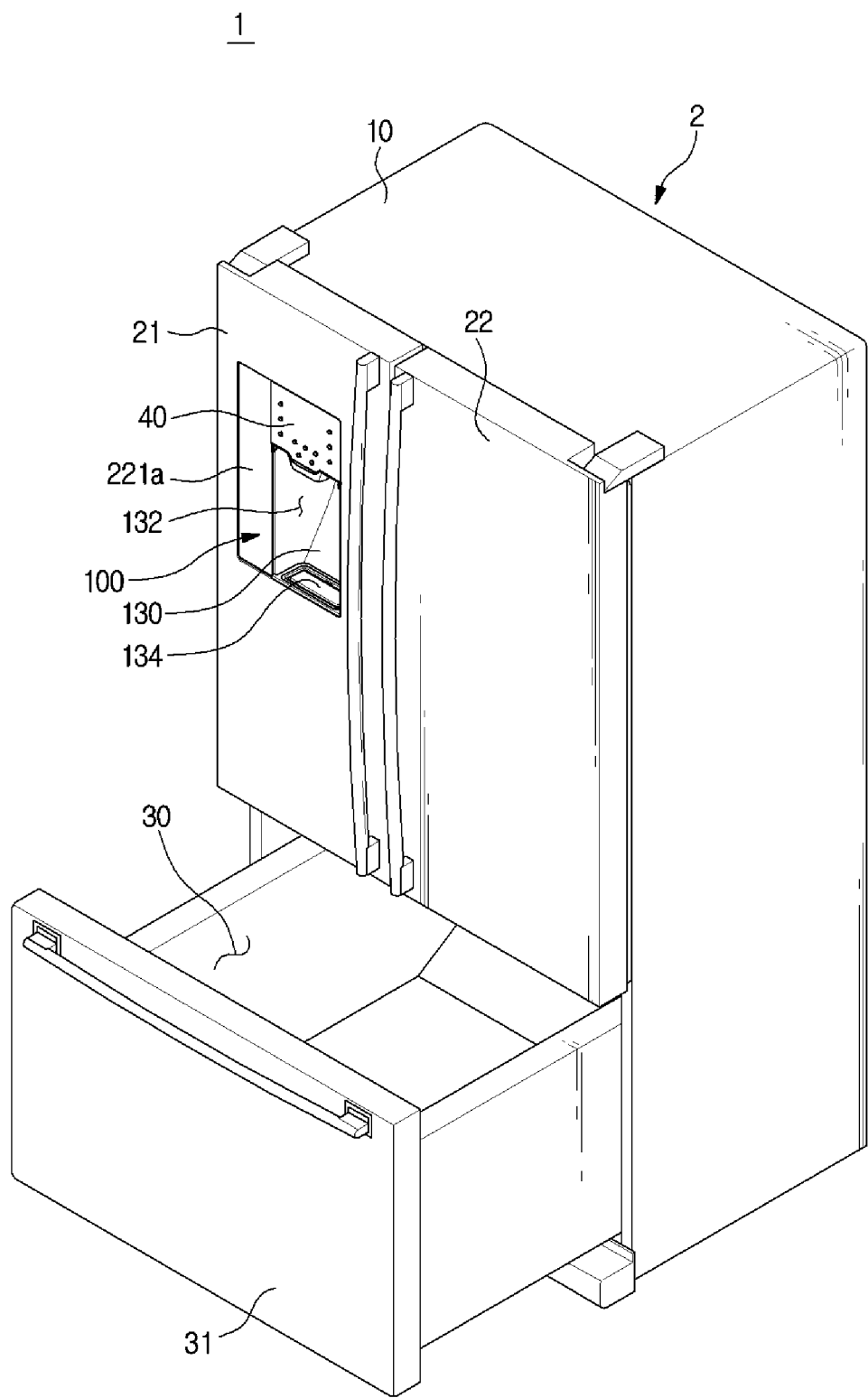
FIG. 1 is a perspective view related to an exterior of a refrigerator according to one embodiment of the present invention.
Figure 2:
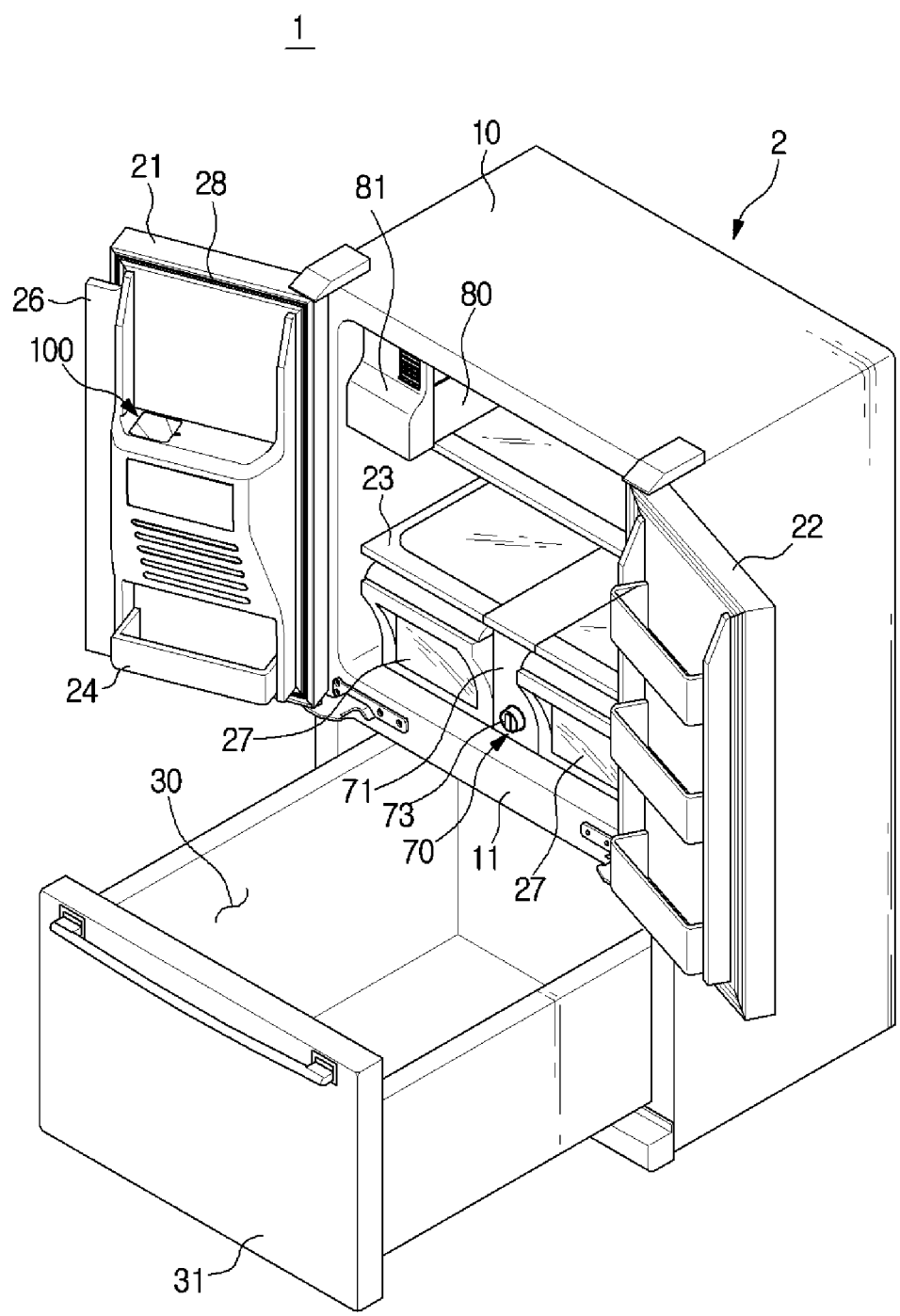
FIG. 2 is a perspective view related to an inner portion of the refrigerator according to one embodiment of the present invention.

FIG. 1 is a perspective view related to an exterior of a refrigerator according to one embodiment of the present invention, and FIG. 2 is a perspective view related to an inner portion of the refrigerator according to one embodiment of the present invention.

As illustrated in FIGS. 1 and 2 the refrigerator 1 according to one embodiment of the present invention may include a refrigerator main body 2 forming an inner cooling space forming an exterior. The cooling space may include storage compartments 20, 30.

The refrigerator main body 2 may include a main body 10, storage compartments 20, 30 provided in the main body 10, and doors 21, 22, and 31 which are capable of opening/closing the storage compartments 20, 30 from one side of the main body 10. In addition, the refrigerator 1 may further include a cooling air supply unit (not shown) which supplies cooling air to the storage compartments 20, 30.

The main body 10 may include an inner box forming the storage compartments 20, 30, an outer box which is coupled to an outer side of the inner box and forms the exterior of the refrigerator, and an insulation member which is interposed between the inner box and the outer box and insulates the storage compartments 20, 30 from the outside.

The storage compartments 20, 30 may be divided into a refrigerator compartment 20 at an upper portion and a freezer compartment 30 at a lower portion by the intermediate partition 11. The refrigerator compartment 20 may be maintained at about 3° above zero to store food under a refrigeration, and the freezer compartment 30 is maintained at about 18.5° below zero.

Although the refrigerator compartment 20 and the freezer compartment 30 which are vertically divided are described in the above, it is not limited thereto, and the refrigerator compartment 20 and the freezer compartment 30 may be laterally divided by the intermediate partition 11.

Shelves 23 on which food may be put and at least one storage box 27 which stores food in a sealed state may be provided in the refrigerator compartment 20.

In addition, the refrigerator compartment 20 may be provided with a purified water supply module 210 which purifies and stores water, and the purified water supply module 210 may include a purifying water filter 73 which purifies water supplied by a water source 212, a purified water tank 71 which stores the purified water, etc.

In addition, although the purified water supply module 210 may be provided between a plurality of storage boxes 27 as illustrated in FIG. 2, it is not limited thereto. It is sufficient for the purified water supply module 210 to be provided in the refrigerator compartment 20 such that purified water in the purified water supply module 210 is cooled by cooling air in the refrigerator compartment 20.

In addition, an ice-making room 80 which is capable of making ice and separated from the refrigerator compartment 20 may be formed at an upper corner of the refrigerator compartment 20. An ice-making device 81 which makes and stores ice may be provided in the ice-making room 80. The ice-making device 81 may include an ice-making tray which makes ice using purified water supplied from the purified water tank 70, an ice bucket which stores the ice made by the ice-making tray, etc.

Each of the refrigerator compartment 20 and the freezer compartment 30 has an open front through which food is put in or out. The open front of the refrigerator compartment 20 may be opened/closed by a pair of rotating doors 21, 22 hinge-coupled to the main body 10, and the open front of the freezer compartment 30 may be opened/closed by a sliding door 31 which is movable by sliding with respect to the main body 10.

A door guard 24 capable of storing food may be provided on the rear surface of the refrigerator compartment doors 21, 22. Gaskets 28 which seal between the refrigerator compartment doors 21, 22 and the main body 10 to keep cooling air of the refrigerator compartment 20 when the refrigerator compartment doors 21, 22 are closed may be provided at edges of the rear surfaces of the refrigerator compartment doors 21, 22.

In addition, a rotational bar 26 which seals between the refrigerator compartment door 21 and the refrigerator compartment door 22 to keep the cooling air of the refrigerator compartment 20 when the refrigerator compartment doors 21, 22 are closed may optionally be provided at any one refrigerator compartment door of the refrigerator compartment doors 21, 22.

In addition, a dispenser 100 capable of extracting purified water, carbonated water, or ice from the outside without opening the refrigerator compartment door 21 and a user interface 40 which receives a control command related to an operation of the refrigerator 1 from a user and displays the operation information of the refrigerator 1 may be provided in any one refrigerator compartment door 21 of the refrigerator compartment doors 21, 22.

A user may insert a container such as a cup or a bottle in a water-dispensing space provided in the dispenser 100 and obtain purified water, carbonated water, or ice. For example, a user may insert a cup and obtain purified water or ice.

Particularly, a user may couple a carbonated water container 170 to a production module 250 and may produce a carbonated water in the carbonated water container 170.

A specific structure and an operation of the dispenser 100 will be described in detail later.

The user interface 40 may include a touch switch which receives various control commands for the refrigerator 1 from a user and a display which displays operation information of the refrigerator 1 to a user.

The user interface 40 may receive a target temperature of the refrigerator compartment 20, a target temperature of the freezer compartment 30, a carbonated water production command, a carbonated water target concentration, and the like and may display the current temperature of the refrigerator compartment 20, the current temperature of the freezer compartment 30, whether carbonated water is produced, the concentration of the produced carbonated water, and the like corresponding to the control commands of a user.

A carbonated water production assembly 200 which produces carbonated water may be installed in a door 21 of the refrigerator 1.

A specific structure and operation of the carbonated water production assembly 100 will be described in detail later.

Figure 3:
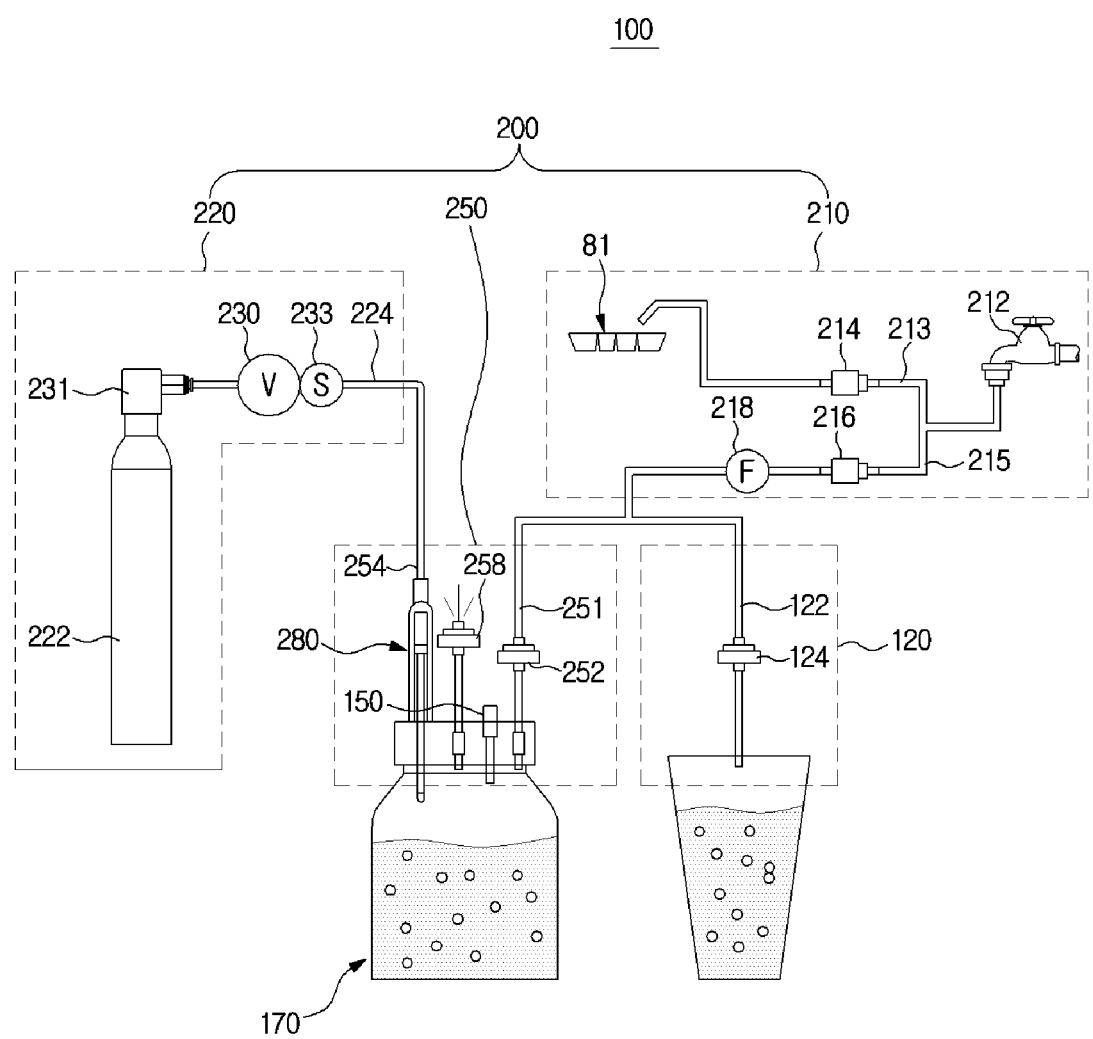
FIG. 3 is a view simply illustrating a structure of a dispenser according to one embodiment of the present invention.

FIG. 3 is a view simply illustrating a structure of a dispenser according to one embodiment of the present invention.

The dispenser 100 includes a dispenser module 120 and a carbonated water production assembly 200. Purified water or ice may be obtained through the dispenser module 120, and carbonated water may be provided to be produced by the carbonated water production assembly 200.

The carbonated water production assembly 200 is provided to produce carbonated water.

The carbonated water production assembly 200 supplies purified water and carbon dioxide to the carbonated water container 170 such that carbonated water is produced in the carbonated water container 170.

The carbonated water production assembly 200 includes a purified water supply module 210, a carbon dioxide supply module 220, and the production module 250.

The purified water supply module 210 may include the water source 212, an ice-making valve 214 provided to supply purified water to the ice-making device 81, a purified water valve 216 provided to supply the purified water to the production module 250 or the dispenser module 120, and a flow sensor which detects an amount of the supplied purified water.

The water source 212 may also include a separate water tank and may also be provided to be directly connected to a water source 212 outside of the refrigerator such that water is supplied. The water source 212 outside the refrigerator may include a tab water pipe. The tab water pipe is illustrated as one example of the water source 212 in FIG. 3.

The ice-making valve 214 is provided to open/close an ice-making flow path 213 through which purified water is supplied from water source 212 to the ice-making device 81, and the purified water valve 216 is provided to open/close a purified water flow path 215 through which purified water is supplied from the water source 212 to the production module 250 or the dispenser module 120.

The ice-making valve 214 and the purified water valve 216 are provided to block a high pressure from the water source 212 and to adjust an amount of purified water sent to the ice-making device 81, the production module 250, or the dispenser module 120. A shape of the ice-making valve 214 and the purified water valve 216 is not limited, and a solenoid valve may be applied as one embodiment.

The water source 212 may also be provided to be connected to the ice-making valve 214 and the purified water valve 216 to supply purified water. Although it is not illustrated, a flow path switching valve may also be provided to supply purified water.

When the flow path switching valve is applied, the flow path switching valve may be provided with a three way valve including an inlet connected to the water source 212, a first outlet connected to the ice-making device 81, and a second outlet connected to the production module 250 or the dispenser module 120. The flow path switching valve may supply purified water supplied from the water source 212 to at least any one of the production module 250, the dispenser module 120, or the ice-making device 81.

Specifically, when an ice-making operation is not required, the flow path switching valve opens a flow path of a side of the production module 250 or the dispenser module 120 and closes a flow path of a side of the ice-making device 81 to supply purified water from the water source 212. In addition, when the ice-making operation is required, the flow path switching valve closes the flow path of the side of the production module 250 or the dispenser module 120 and opens the flow path of the side of the ice-making device 81 to supply purified water to the ice-making device.

The refrigerator 1 may calculate an amount of purified water which is supplied from the water source 212 to the production module 250 or the dispenser module 120 using a flow sensor 218. Although the flow sensor 218 is provided to be connected to purified water valve 216 in FIG. 3, it is not limited thereto. For example, the flow sensor 218 is disposed at an upper side of the purified water valve 216 and the ice-making valve 214 to calculate an amount of purified water supplied to the purified water supply module 210.

The flow sensor illustrated in FIG. 3 illustrates merely one example of a method of sensing a liquid which is capable of being applied to the refrigerator according to one embodiment of the present invention, but it is not limited thereto.

In addition, the purified water supply module 210 illustrated in FIG. 3 also illustrates one example of a method of supplying purified water which is capable of being applied to the refrigerator according to one embodiment of the present invention, but it is not limited thereto.

The carbon dioxide supply module 220 includes a carbon dioxide cylinder 222 which stores carbon dioxide and a carbon dioxide supply valve 230 which adjusts an amount of the carbon dioxide supplied from the carbon dioxide cylinder 222 to the production module 250. The carbon dioxide supply valve 230 may be provided to be covered by a supply valve case 230a (see FIG. 6).

The carbon dioxide cylinder 222 may store carbon dioxide having a high pressure of about 45 to 60 bar.

A carbon dioxide which is stored in the carbon dioxide cylinder 222 may be discharged to the carbonated water container 170 through a carbon dioxide supply path 224 which connects the carbon dioxide cylinder 222 and the production module 250.

The carbon dioxide supply path 224 guides carbon dioxide stored in the carbon dioxide cylinder 222 to the production module 250.

In addition, the carbon dioxide supply valve 230 which opens/closes the carbon dioxide supply path 224 may be provided on the carbon dioxide supply path 224.

The carbon dioxide supply valve 230 opens or closes the carbon dioxide supply path 224.

When the carbon dioxide supply valve 230 is open, carbon dioxide stored in the carbon dioxide cylinder 222 is discharged to the carbonated water container 170 through the carbon dioxide supply path 224.

Such a carbon dioxide supply valve 230 may also adopt a solenoid valve which opens/closes the carbon dioxide supply path due to an electrical signal. The carbon dioxide supply valve 230 will be described below in detail as one example.

The carbon dioxide supply module 220 may include a carbon dioxide pressure sensor 233. The carbon dioxide pressure sensor 233 is provided to sense a discharge pressure of carbon dioxide discharged from the carbon dioxide cylinder 222. The carbon dioxide pressure sensor 233 may adopt a pressure switch which output a low pressure sensed signal corresponding to a case when a pressure of a carbon dioxide decreases to a predetermined pressure or less.

Carbon dioxide supplied from the carbon dioxide supply module 220 through the production module 250 and purified water supplied from the purified water supply module 210 flow into the carbonated water container 170, and carbonated water is produced in the carbonated water container 170.

The carbonated water container 170 is detachably provided in the production module 250.

The production module 250 includes a purified water inflow path 251 connected to the purified water supply module 210 and a purified water inflow valve 252 which opens/closes the purified water inflow path 251. An amount of purified water which flows into carbonated water container 170 may be adjusted by opening/closing the purified water inflow valve 252.

The production module 250 includes a carbon dioxide inflow path 254 connected to the carbon dioxide supply module 220 and a nozzle module 280 provided to be operated due to carbon dioxide which flows into the carbon dioxide inflow path 254. The nozzle module 280 is provided to be operated due to carbon dioxide supplied to the production module 250 and is provided to spray the supplied carbon dioxide into the carbonated water container 170.

The nozzle module 280 will be described in detail later.

The production module 250 may include a vent valve 258. When carbon dioxide is injected into the carbonated water container 170, the vent valve 258 is provided to prevent a pressure in the carbonated water container 170 from increasing excessively. Specifically, when a pressure of carbon dioxide in the carbonated water container 170 is greater than a predetermined pressure, the vent valve 258 is opened such that the carbon dioxide is discharged to the outside.

The dispenser module 120 includes a dispenser supply path 122 connected to the purified water supply module 210 and a dispenser supply valve 124 which opens/closes the dispenser supply path 122. An amount of purified water supplied to a water-dispensing space 132 may be adjusted by opening/closing the dispenser supply valve 124.

The carbonated water production assembly 200 may include a relief valve 150. When purified water of an amount greater than a predetermined amount is supplied in a production process of carbonated water or carbonated water of an amount greater than a predetermined amount is produced, the relief valve 150 is provided to discharge the overflowing purified water or the carbonated water.

Figure 4:
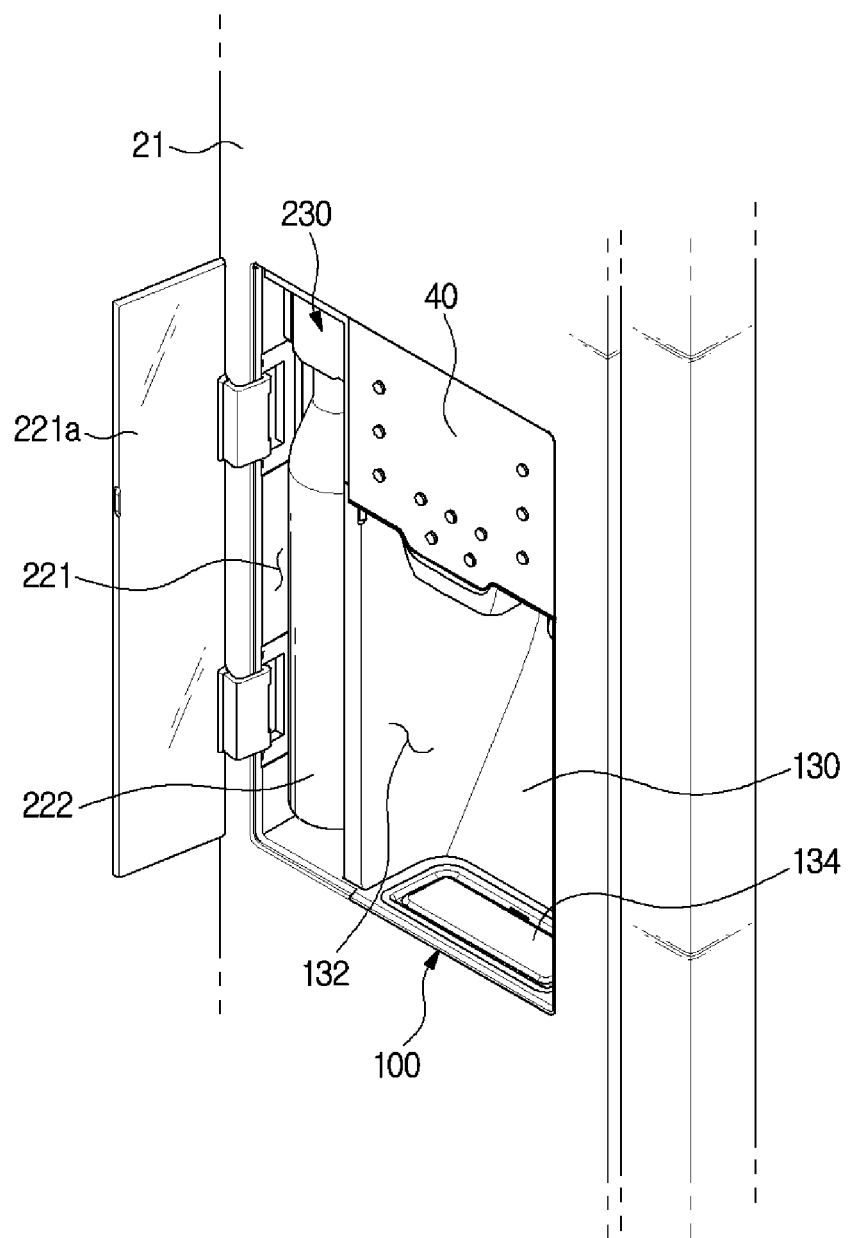
FIG. 4 is an enlarged view illustrating the dispenser according to one embodiment of the present invention.
Figure 5:
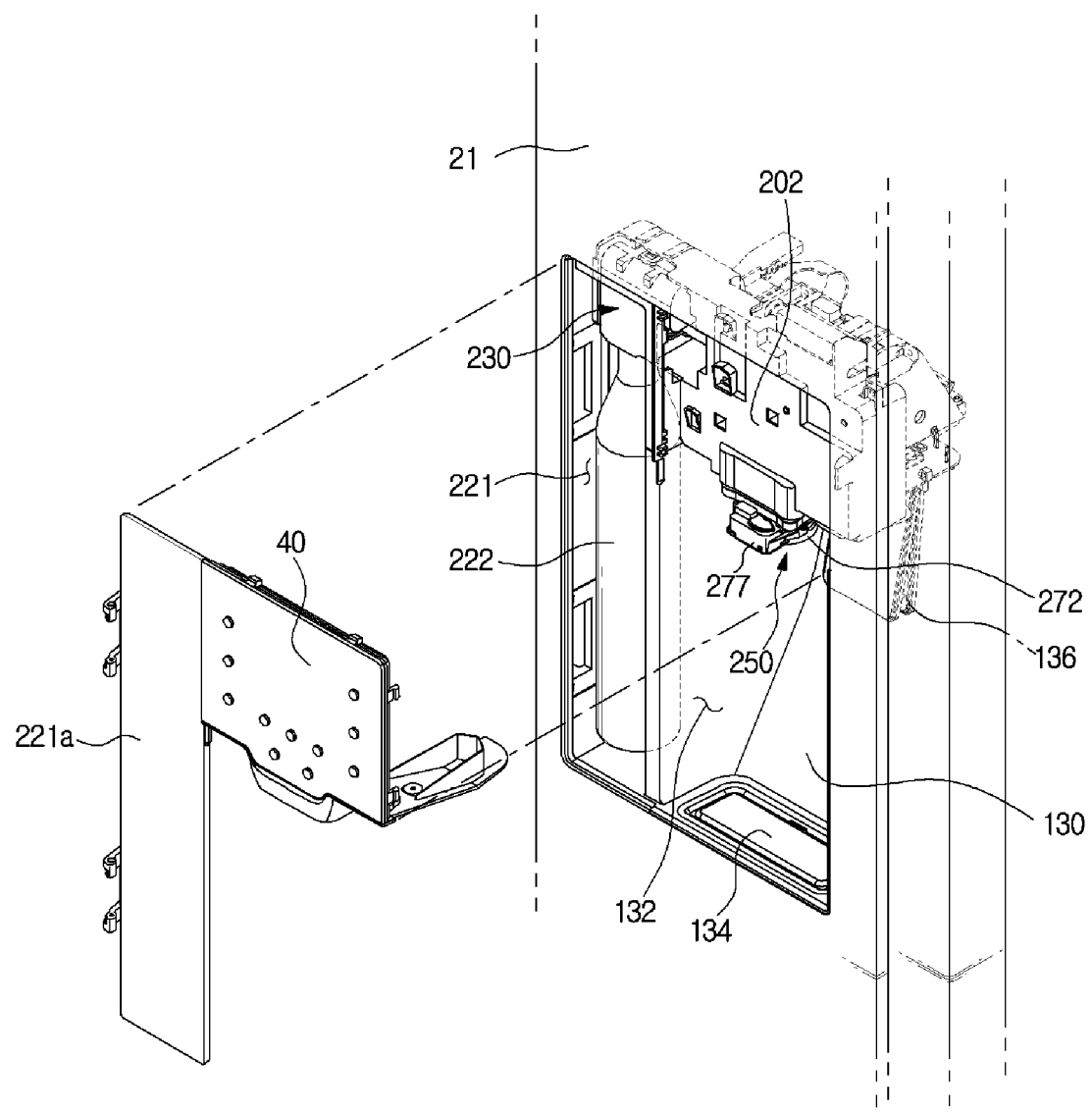
FIG. 5 is a partially exploded perspective view illustrating the dispenser according to one embodiment of the present invention.

FIG. 4 is an enlarged view illustrating the dispenser according to one embodiment of the present invention, and FIG. 5 is a partially exploded perspective view illustrating the dispenser according to one embodiment of the present invention.

The carbonated water production assembly 200 may be provided in the door 21. The water-dispensing space 132 may be formed in the door 21 to be exposed from a front surface to the outside, and the carbonated water container 170 may be accommodated in the water-dispensing space 132. The carbonated water container 170 may be provided in the water-dispensing space 132 to be separable from the production module 250. In addition, an installation body 272 in which the carbonated water container 170 is installed in the production module 250 may be provided to be exposed in the water-dispensing space 132.

The carbonated water production assembly 200 may include the water-dispensing space 132 formed at the front surface of the door and a dispenser housing 130 formed concavely from the front surface of the door to form the water-dispensing space 132. The water-dispensing space 132 and the dispenser housing 130 may be one structure of the dispenser 100. A water collecting case 134 which collects a discharged liquid such as purified water and carbonated water discharged from the water-dispensing space 132 are provided at the lower portion of the dispenser housing 130. The discharged liquid water discharged to the water-dispensing space 132 is collected into the water collecting case 134.

The carbon dioxide supply module 220 may include a cylinder accommodation space 221 such that the carbon dioxide cylinder 222 is separable. The cylinder accommodation space 221 may be provided at a side portion of the water-dispensing space 132 to be adjacent to the water-dispensing space 132. The carbon dioxide cylinder 222 is disposed in the cylinder accommodation space 221, and the carbon dioxide cylinder 222 is provided to be installed to the cylinder connector 231 to supply carbon dioxide to the carbon dioxide supply path 224. The carbon dioxide supply module 220 may include a cylinder door 221a which opens/closes the cylinder accommodation space 221.

The user interface 40 may be provided in the front surface of the door 21. As previously described, the user interface 40 may include the touch switch which receives the various control commands for the refrigerator 1 from the user, and the display which displays the operation information of the refrigerator 1 to the user.

The carbonated water production assembly 200 is provided in the door to supply purified water and carbon dioxide to the carbonated water container 170 accommodated in the water-dispensing space 132.

An operation lever 136 may be provided in the water-dispensing space 132 such that water is supplied through the dispenser module 120 or ice is discharged through the ice-making device 81.

Figure 6:
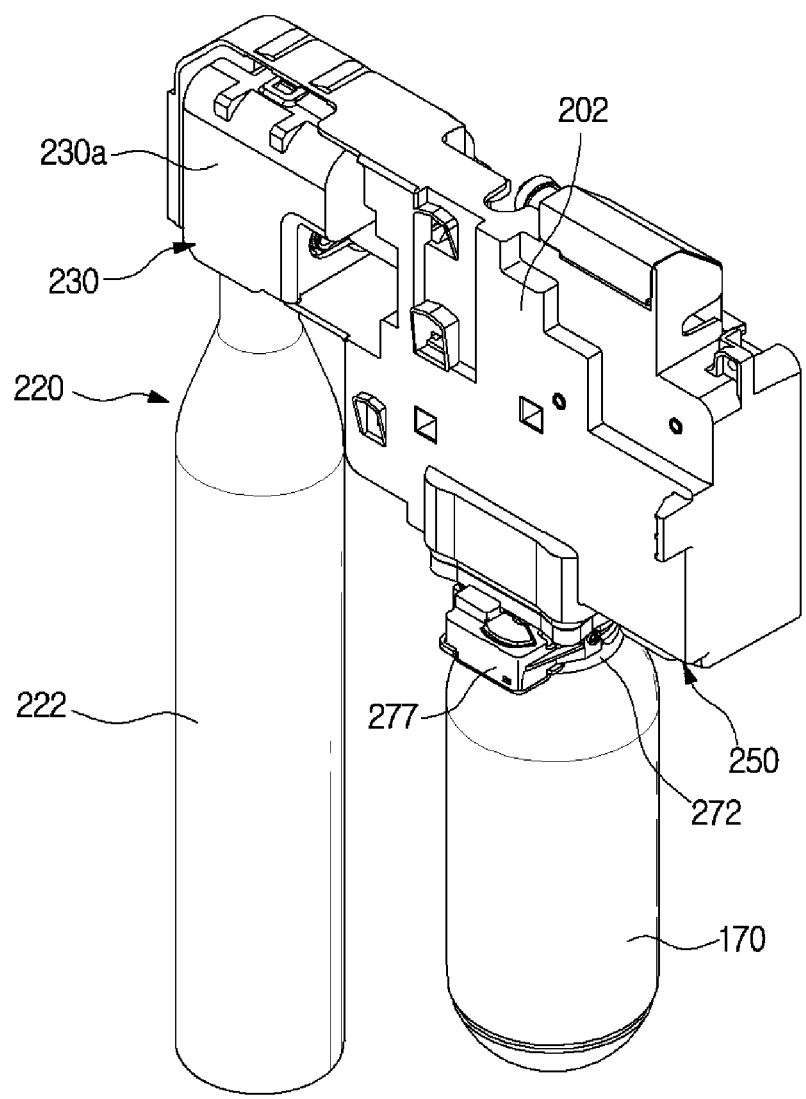
FIG. 6 is a perspective view illustrating a carbon dioxide supply module and a production module according to one embodiment of the present invention.
Figure 7:
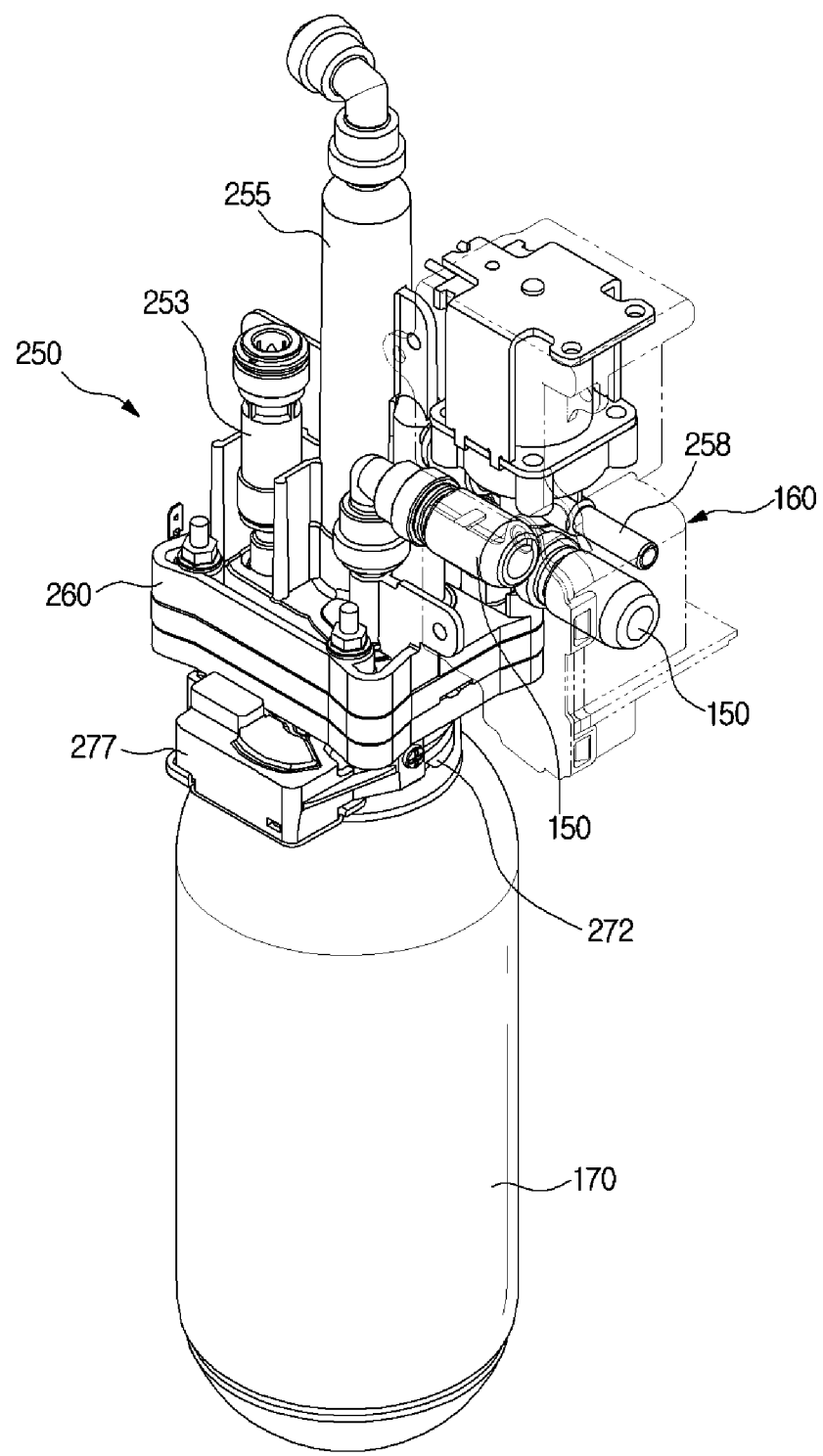
FIG. 7 is a perspective view illustrating the production module and a carbonated water container according to one embodiment of the present invention.
Figure 8:
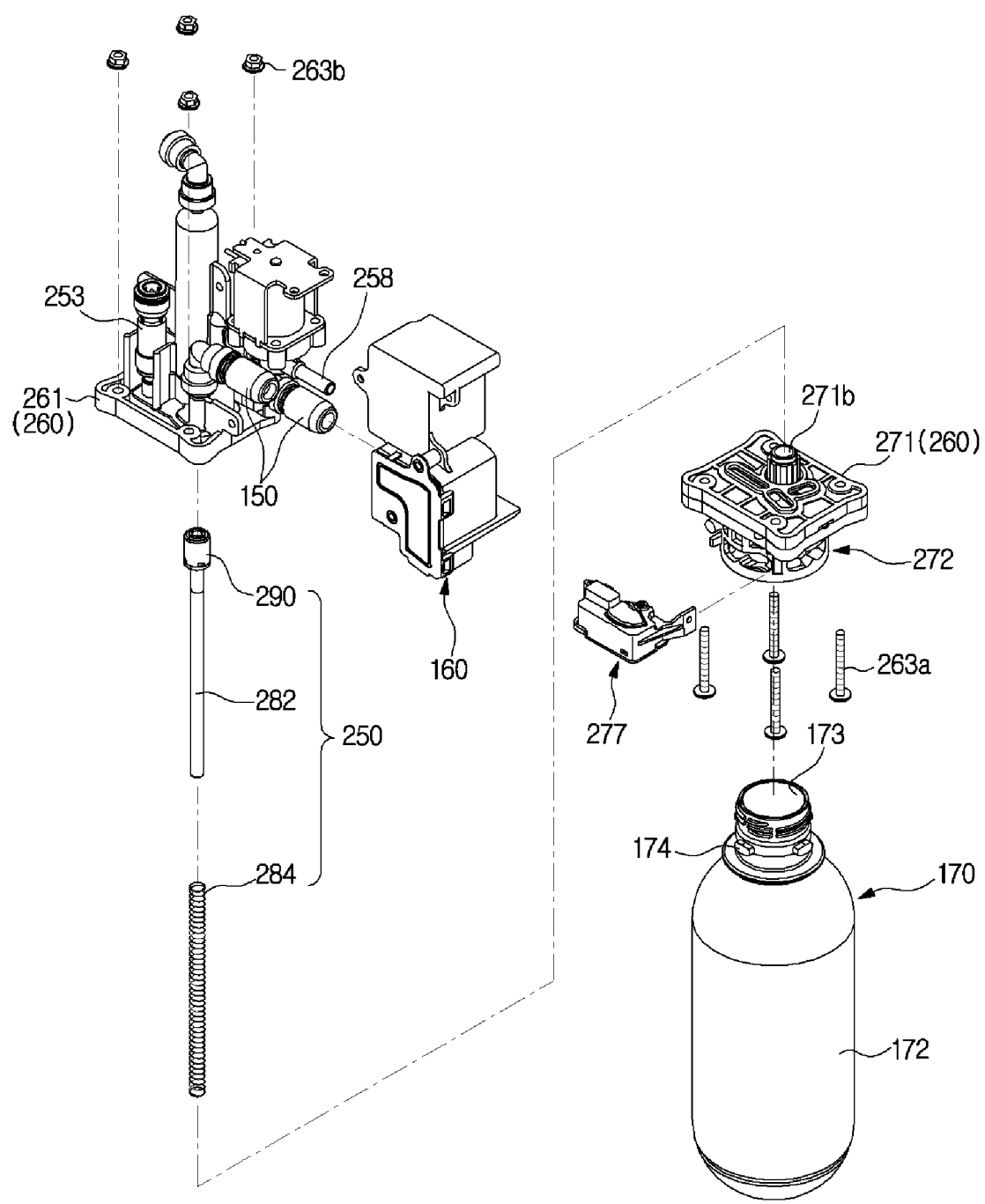
FIG. 8 is an exploded perspective view illustrating the production module and the carbonated water container according to one embodiment of the present invention.

FIG. 6 is a perspective view illustrating a carbon dioxide supply module and a production module a according to one embodiment of the present invention, FIG. 7 is a perspective view illustrating the production module and a carbonated water container according to one embodiment of the present invention, and FIG. 8 is an exploded perspective view illustrating the production module and the carbonated water container according to one embodiment of the present invention.

The carbonated water production assembly 200 may include a module cover 202 to cover an outside of the carbon dioxide supply module 220 or the production module 250. The module cover 202 is provided such that flow paths in which purified water and carbon dioxide flow in the carbonated water production assembly 200 and a connection portion of the flow paths are not exposed to the outside to improve durability. In addition, as the module cover 202 is provided to cover at least a part of the carbon dioxide supply module 220 and the production module 250, a noise occurring while purified water and carbon dioxide are flowing may be blocked.

The production module 250 is provided such that the carbonated water container 170 is separable, and purified water and carbon dioxide are capable of being injected into the carbonated water container 170.

The production module 250 may include a production module body 260.

The production module body 260 may include the installation body 272 in which the carbonated water container 170 is installed. The installation body 272 is provided to be exposed to the water-dispensing space 132 such that the carbonated water container 170 is installable. That is, the carbonated water container 170 is provided to be installed in the installation body 272 and configured to be separable from the installation body 272. An installation sensor 277 which senses whether the carbonated water container 170 is installed is provided at one side of the installation body 272. The installation body 272 and the installation sensor 277 will be described in detail later.

The production module 250 may include a purified water inflow pipe 253 forming the purified water inflow path 251 and a carbon dioxide inflow pipe 255 forming the carbon dioxide inflow path. Purified water which flows through the purified water flow path 215 flows into purified water inflow pipe 253, and carbon dioxide which flows through the carbon dioxide supply path flows into the carbon dioxide inflow pipe 255. The purified water and the carbon dioxide respectively flowing through the purified water inflow pipe 253 and the carbon dioxide inflow pipe 255 may be injected into the carbonated water container 170.

The purified water inflow pipe 253 and the carbon dioxide inflow pipe 255 may be coupled to the production module body 260. Specifically, the installation body 272 is provided at one side of the production module body 260, and the purified water inflow pipe 253 and the carbon dioxide inflow pipe 255 may be coupled to the other side of the production module body 260. Specifically, the installation body 272 may be provided in a second module body 271 which will be described later, and the purified water inflow pipe 253 and the carbon dioxide inflow pipe 255 may be coupled to the first module body 261.

The carbonated water production assembly 200 may include the relief valve 150. When purified water of an amount greater than a predetermined amount is supplied or carbonated water of an amount greater than a predetermined amount is produced in a production process of carbonated water, the relief valve 150 is provided to discharge the overflowing purified water or the carbonated water. An amount of the carbon dioxide supplied to the carbonated water container 170 may also be adjusted by the carbon dioxide supply module 220, or an amount of the carbon dioxide supplied to the carbonated water container 170 may also be adjusted by the relief valve 150. Specifically, the relief valve 150 may be provided to be capable of opening/closing to adjust an amount of the carbon dioxide supplied to the carbonated water container 170.

The relief valve 150 may also be provided to be opened under a predetermined condition such as an overflow of a discharging fluid or to be opened/closed by a control.

The relief valve 150 may be provided to be coupled to the production module body 260 of the production module 250. Specifically, when the carbonated water container 170 is installed in the production module 250, one end of the relief valve 150 is provided to communicate with an inner portion of the carbonated water container 170, and the other end of the relief valve 150 is provided to communicate with the discharge module 160.

The carbonated water production assembly 200 may include a discharge module 160. The discharge module 160 is provided such that carbonated water which overflows from the carbonated water container 170 is discharged by detouring the carbonated water container 170. The discharge module 160 may be provided to wrap around a discharge portion of the relief valve 150. The discharge module 160 will be described in detail later.

The production module 250 may include the nozzle module 280. The nozzle module 280 is provided to spray carbon dioxide into the carbonated water container 170. The nozzle module 280 is provided to be operated due to carbon dioxide which is supplied from the carbon dioxide supply module 220 and flows into the production module 250. A structure and an operation of the nozzle module 280 will be described in detail later.

The production module body 260 may include a first module body 261 and the second module body 271.

The first module body 261 may be provided to be coupled to the previously described purified water inflow pipe 253 and the carbon dioxide inflow pipe 255, and the second module body 271 may be provided to be coupled to a lower portion of the first module body 261, and the installation body 272 may be provided. That is, the carbonated water container 170 may be detachably provided in the second module body 271. A method of coupling the first module body 261 and the second module body 271 is not limited, and as an example thereof, the first module body 261 and the second module body 271 may be coupled using a coupling bolt 263a and a coupling nut 263b.

Figure 9:
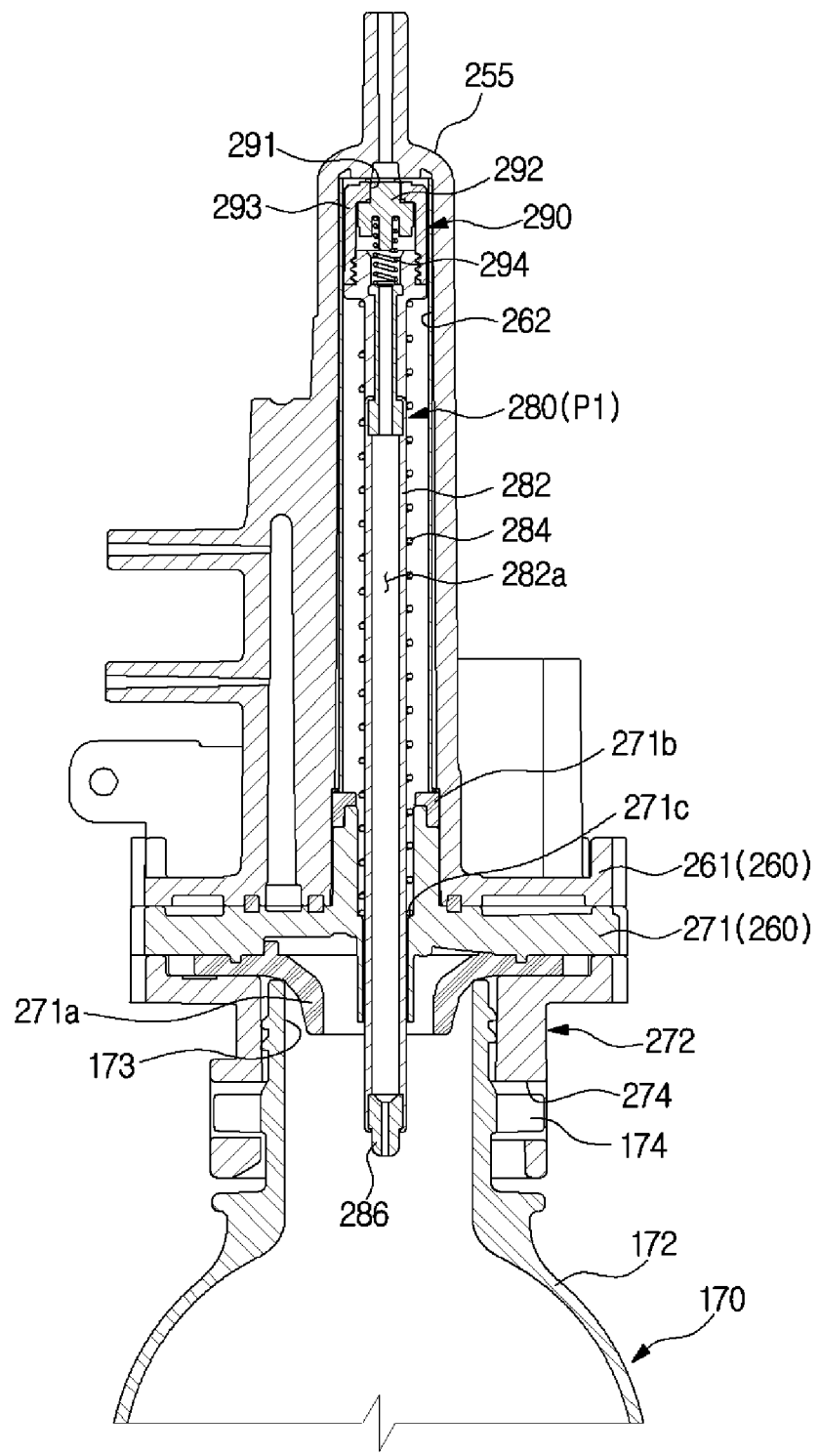
FIGS. 9, 10, 11, and 12 are views related to an operation of a nozzle module according to one embodiment of the present invention.
Figure 10:
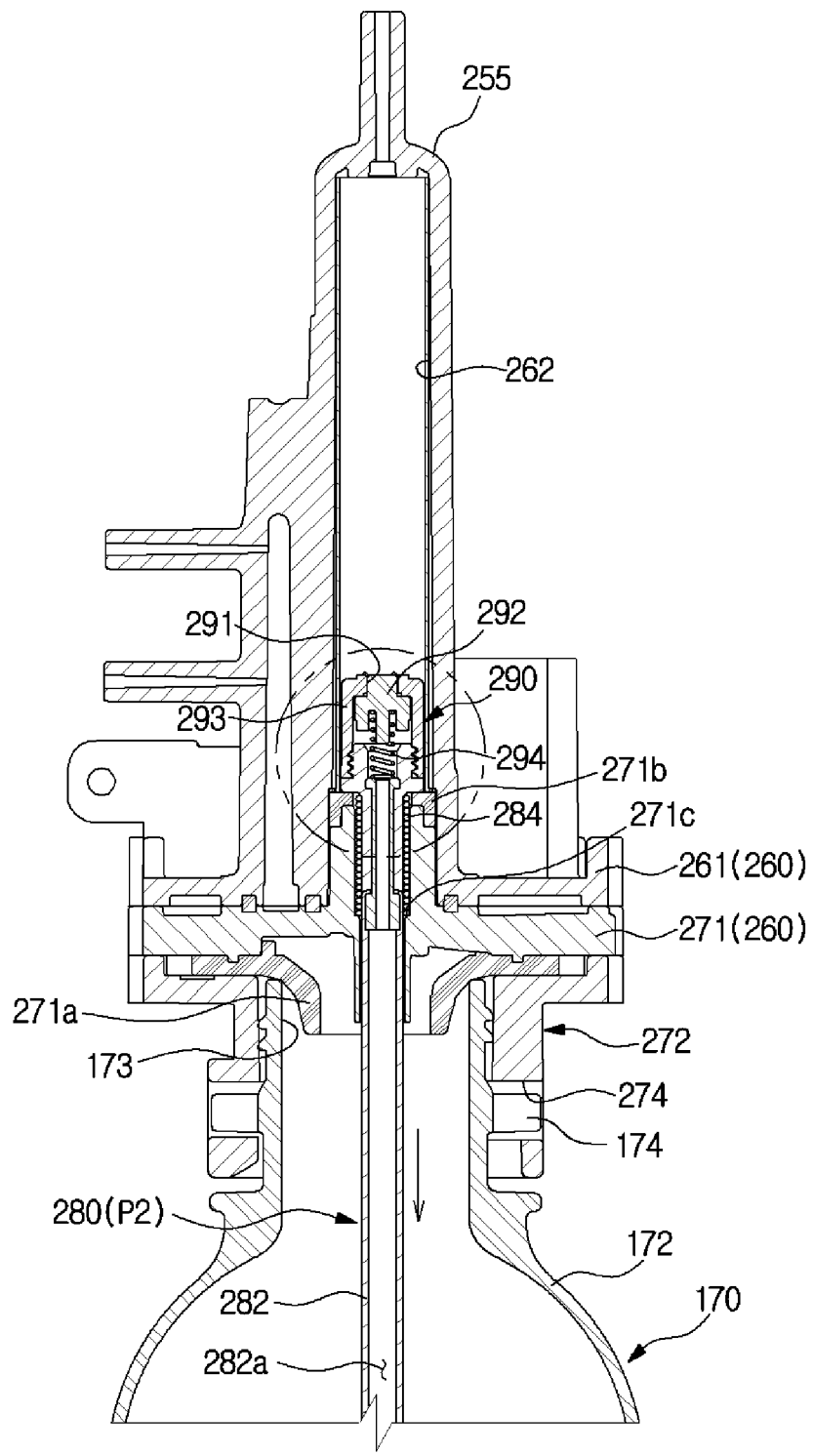
Figure 11:
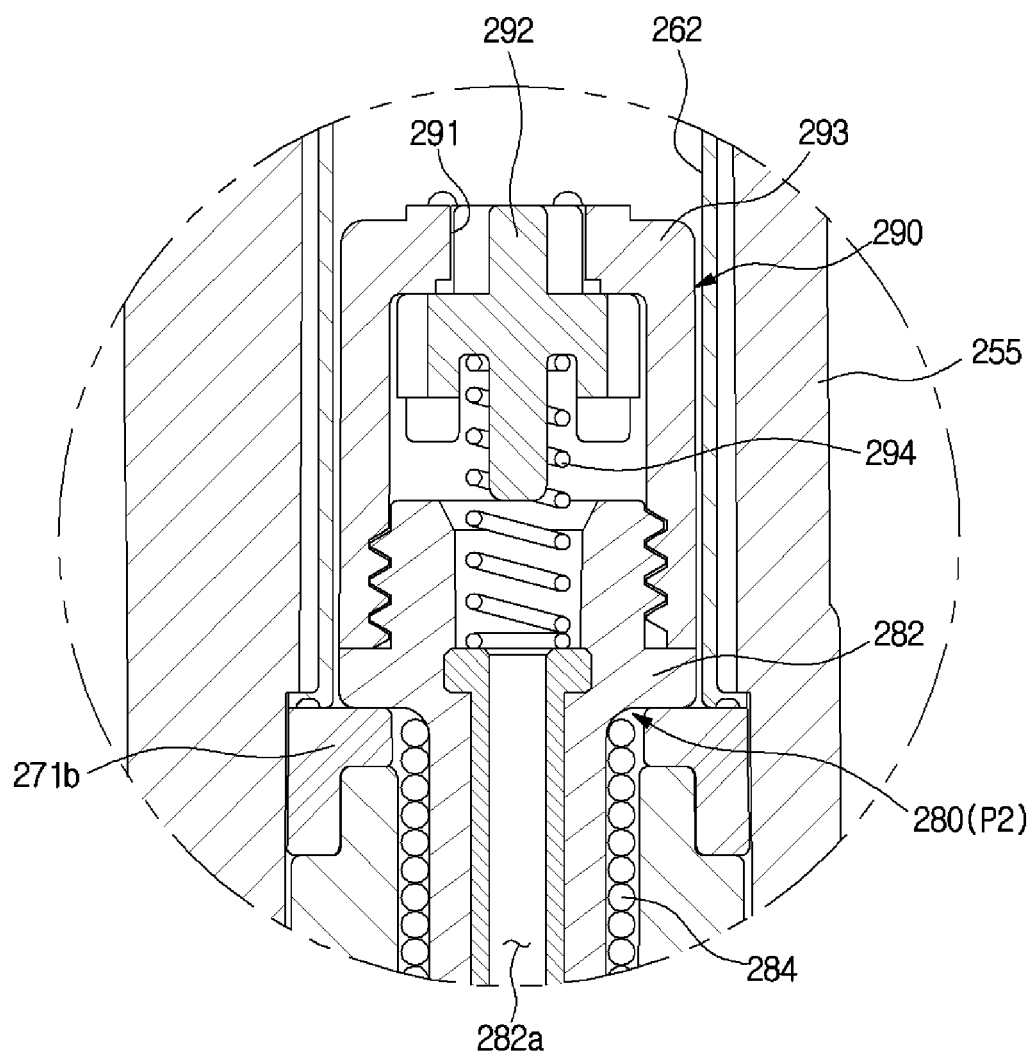
Figure 12:
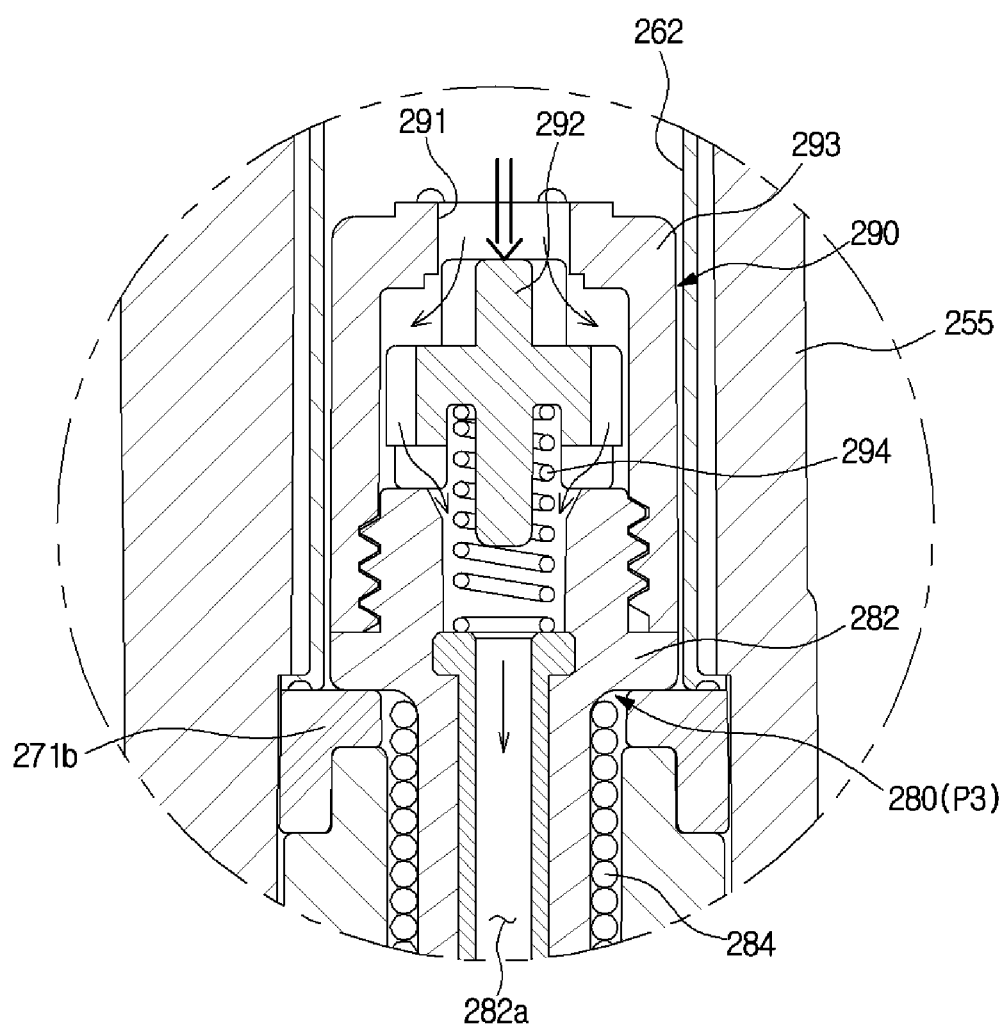

A nozzle moving portion 262 may be provided in the first module body 261 such that the nozzle module 280 is movable (see FIG. 9). The nozzle moving portion 262 is provided at inner side surface of the carbon dioxide inflow pipe 255 and is configured such that the nozzle module 280 operates due to carbon dioxide flowing into the carbon dioxide inflow pipe 255.

A stopper 271b which limits a movement of the nozzle module 280 may be provided in the second module body 271. The stopper 271b is provide on a top surface of the second module body 271 and is provided to limit a movement of the nozzle module 280 which moves through the nozzle moving portion 262. Specifically, when carbon dioxide is supplied to the production module 250, a movement of the nozzle pipe 282 is limited to a supply enabled position P2.

FIGS. 9, 10, 11, and 12 are views related to an operation of a nozzle module according to one embodiment of the present invention.

As described above, the nozzle module 280 is provided to spray carbon dioxide into the carbonated water container 170. Specifically, the nozzle module 280 may operate to spray carbon dioxide below water surface of purified water stored in the carbonated water container 170. Since the carbon dioxide is sprayed below the water surface of the purified water stored in the carbonated water container 170 by the nozzle module 280, solubility of carbon dioxide in the purified water may be improved to be greater than a case when the carbon dioxide is sprayed above the water surface of the purified water. Since the carbon dioxide may be directly sprayed below the water surface of the purified water by the nozzle module 280, solubility of the carbon dioxide may be improved. Through this, an amount of carbon dioxide needed to be supplied for producing carbonated water may be decreased. In addition, time that carbon dioxide takes to dissolve in purified water when carbonated water is produced may be decreased. The nozzle module 280 is provided to operate due to carbon dioxide which is supplied by the carbon dioxide supply module 220 and flows into the production module 250.

The nozzle module 280 is provided to move due to carbon dioxide which flows into the production module 250 and provided to be movable to directly spray the carbon dioxide in the carbonated water container 170. Specifically, the nozzle module 280 is provided to move by the carbon dioxide which flows into the production module 250 and provided to directly spray the carbon dioxide below a surface of purified water stored in the carbonated water container 170. Through this, as described above, the efficiency of carbon dioxide dissolving in purified water for a production of carbonated water may be improved.

The nozzle module 280 may include a nozzle pipe 282 and a valve unit 290.

The nozzle pipe 282 is provided to be movable through an inner portion of the production module 250, that is, the nozzle moving portion 262. A carbon dioxide spray nozzle 286 is provided at one end of the nozzle pipe 282 such that carbon dioxide which flows into the other end is sprayed through the carbon dioxide spray nozzle 286. An inner portion of the nozzle pipe 282 is provided to be empty such that a nozzle pipe flow path 282*a* through which carbon dioxide flows may be provided.

The valve unit 290 may be provided at the other end of the nozzle pipe 282. The valve unit 290 may include an inlet hole 291 and a valve portion 292. The inlet hole 291 is provided such that carbon dioxide flows into the nozzle pipe 282 from the inner portion of the production module 250, and the valve portion 292 is provided to open/close the inlet hole 291. Specifically, carbon dioxide which flows into the carbon dioxide inflow pipe 255 flows into the nozzle pipe flow path 282*a* through the inlet hole 291, and the valve portion 292 is provided to open the inlet hole 291 when an internal pressure of the carbon dioxide inflow pipe 255 becomes a predetermined pressure. Since the valve unit 290 is provided at the other end of the nozzle pipe 282, the other end of the nozzle pipe 282 is provided to be sealed by the valve unit 290 when a predetermined pressure of carbon dioxide is not applied.

The valve unit 290 may include a valve housing 293. The inlet hole 291 is provided in the valve housing 293, and the valve portion 292 is positioned in the valve housing 293. The valve housing 293 is provided to be coupled to the nozzle pipe 282 and provided such that the valve portion 292 therein is not separated to the outside and moves in the valve housing 293.

The nozzle module 280 is provided to move among a stand-by position P1, the supply enabled position P2, and a supply position P3.

When the nozzle module 280 is positioned at the stand-by position P1, the carbon dioxide spray nozzle 286 is provided to be positioned at an upper portion of a surface of purified water stored in the carbonated water container 170. When carbon dioxide is not supplied, or even when supplied from the carbon dioxide supply module 220, when an inner pressure of the carbon dioxide inflow pipe 255 is less than a first pressure, the nozzle module 280 is configured to be positioned at the stand-by position P1.

When carbon dioxide is supplied to the carbon dioxide inflow pipe 255 of the production module 250 from the carbon dioxide supply module 220 and the internal pressure of the carbon dioxide inflow pipe 255 is at a first pressure, the nozzle module 280 moves from the stand-by position P1, and the carbon dioxide spray nozzle 286 is moved to be positioned below a surface of purified water stored in the carbonated water container 170. This is referred to as the supply enabled position P2.

The nozzle module 280 may include a nozzle elastic member 284. The nozzle elastic member 284 is provided to elastically support the nozzle pipe 282. The nozzle elastic member 284 may be disposed to surround the nozzle pipe 282. Specifically, one end of the nozzle elastic member 284 may be disposed to be supported by the valve unit 290, and the other end may be disposed to be supported by the elastic member support portion 271*c* of the production module body 260 of the second module body 271. The elastic member support portion 271*c* may be provided in the production module body 260, specifically, in the first module body 261. That is, the elastic member support portion 271*c* may be positioned at a lower portion compared to an upper end of the stopper 271*b* in consideration of a maximally compressed length of the nozzle elastic member 284. The nozzle elastic member 284 elastically supports the nozzle pipe 282 such that the nozzle module 280 maintains the stand-by position P1 until a pressure of carbon dioxide in the carbon dioxide inflow pipe 255 becomes the first pressure. When the pressure of carbon dioxide in the carbon dioxide inflow pipe 255 becomes the first pressure, the nozzle pipe 282 moves until the nozzle elastic member 284 is compressed and a movement thereof is restricted by the stopper 271*b*. That is, the nozzle module 280 moves from the stand-by position P1 to the supply enabled position P2. When the nozzle module 280 is positioned at the supply enabled position P2, the carbon dioxide spray nozzle 286 is positioned below a surface of purified water in the carbonated water container 170.

When the internal pressure of the carbon dioxide inflow pipe 255 is less than the first pressure, the nozzle elastic member 284 is provided to support the nozzle pipe 282 in a state in which the nozzle elastic member 284 is compressed in a predetermined section compared to a free state such that the nozzle module 280 maintains the stand-by position P1.

When carbon dioxide is supplied to the carbon dioxide inflow pipe 255 of the production module 250 from the carbon dioxide supply module 220 and a second pressure is greater than the first pressure, the nozzle module 280 moves from the supply enabled position P2 and sprays the carbon dioxide through the carbon dioxide spray nozzle 286. This is referred to as the supply position P3.

The valve unit 290 may include a valve elastic member 294. The valve elastic member 294 is provided to elastically support the valve portion 292. Specifically, one end of the valve elastic member 294 is provided to be supported by the valve portion 292, and the other end is provided to be supported by the nozzle pipe 282. The pressure of carbon dioxide in the carbon dioxide inflow pipe 255 is the second pressure, and the valve elastic member 294 elastically supports the valve portion 292 such that the nozzle module 280 moves from the supply enabled position P2 to the supply position P3. That is, when the internal pressure of the carbon dioxide inflow pipe 255 is less than the second pressure, the valve elastic member 294 elastically supports the valve portion 292 such that the nozzle module 280 maintains the supply enabled position P2.

When the internal pressure of the carbon dioxide inflow pipe 255 is less than the second pressure, the valve elastic member 294 is provided to support the valve portion 292 in a state in which the valve elastic member 294 is compressed in a predetermined section compared to a free state such that the nozzle module 280 maintains the supply enabled position P2.

When the inner pressure of carbon dioxide in the carbon dioxide inflow pipe 255 becomes the second pressure, the valve elastic member 294 is compressed, and the valve portion 292 opens the inlet hole 291. Carbon dioxide of the carbon dioxide inflow pipe 255 passes the open inlet hole 291 flows through the nozzle pipe flow path 282a, and is discharged through the carbon dioxide spray nozzle 286 positioned below a surface of purified water stored in the carbonated water container 170.

In a production process of carbonated water in the carbonated water container 170, by directly spraying carbon dioxide below of a surface of purified water stored in the carbonated water container 170, solubility of carbon dioxide may be improved. In addition, through the above-described process, production efficiency of carbonated water may be improved.

Next, when a supply of carbon dioxide from carbon dioxide supply module 220 is stopped, as the compressed valve elastic member 294 and the nozzle elastic member 284 are recovered, the nozzle module 280 moves from the supply position P3 to the stand-by position P1.

The first pressure and the second pressure are not limited and may vary according to environment of carbonated water production. For example, the first pressure may be designed to be 0.5 bar, and the second pressure may be designed to be 1.5 bar.

Since the second pressure is greater than the first pressure, an elastic force of the valve elastic member 294 may be provided to be greater than that of the nozzle elastic member 284.

The nozzle module 280 will be described again in terms of elastic members 284 and 294.

The nozzle module 280 includes the nozzle elastic member 284 and the valve elastic member 294.

In a supply process of carbon dioxide, the nozzle elastic member 284 is provided such that the nozzle module 280 is positioned at the stand-by position until an internal pressure of the nozzle module 280 becomes the first pressure. Next, when the internal pressure of the nozzle module 280 is equal to or greater than the first pressure and less than the second pressure, the nozzle elastic member 284 is configured to be compressed, and the nozzle module 280 is provided to move from the stand-by position P1 to the supply enabled position P2.

Next, when the internal pressure of the nozzle module 280 becomes the second pressure or more, the valve elastic member 294 is configured to compressed, and the nozzle module 280 is provided to move from the supply enabled position P2 to the supply position P3.

As described above, as the nozzle module 280 is provided to operate in a plurality of steps, the carbon dioxide supply nozzle 286 in which carbon dioxide is discharged in carbonated water production may be positioned below a water level of purified water stored in the carbonated water container 170. In addition, according to the plurality of operation steps of the nozzle module 280, carbon dioxide may be directly sprayed below the water level of purified water through the carbon dioxide supply nozzle 286.

Figure 13:
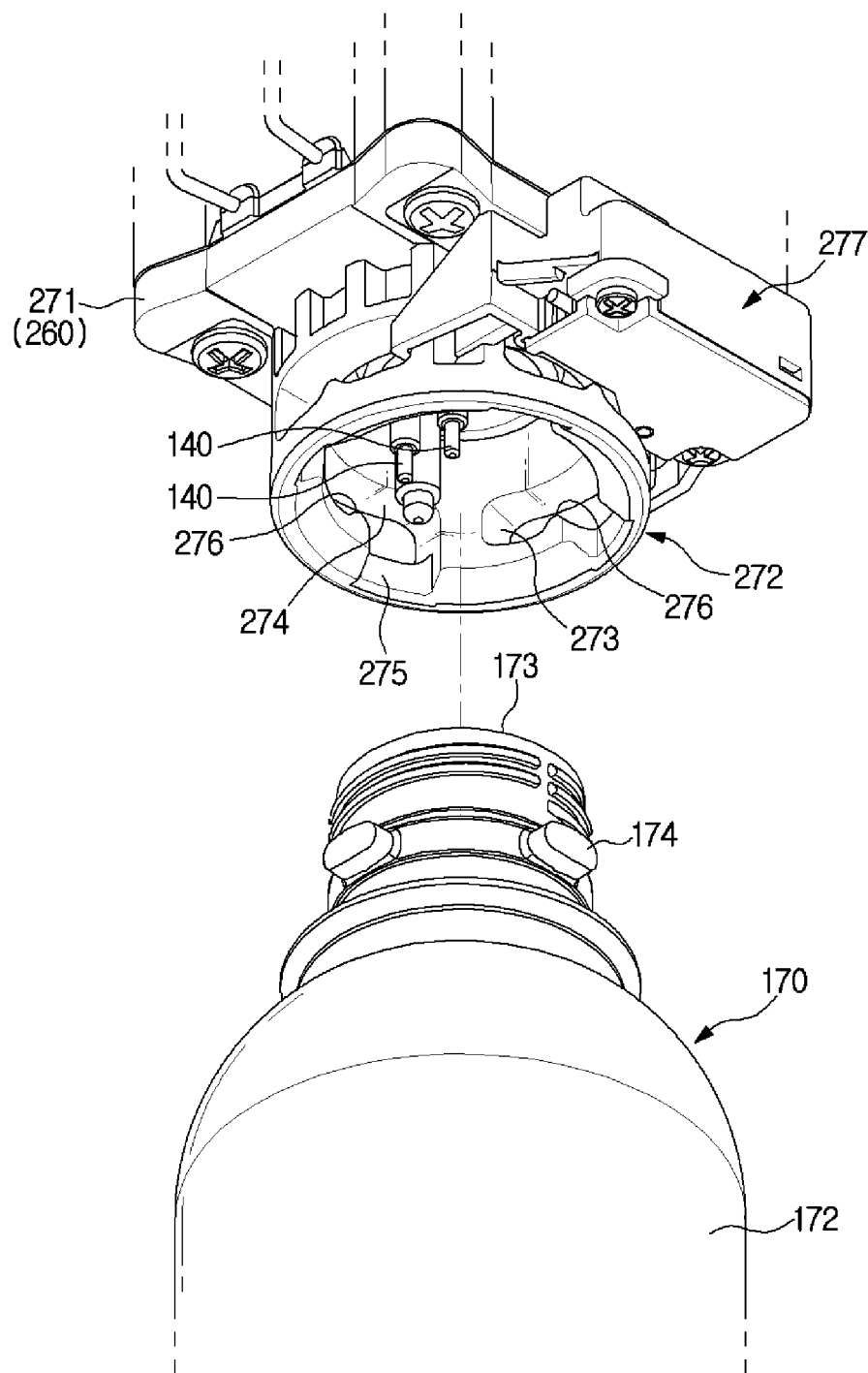
FIGS. 13 and 14 are views related to an installation of the carbonated water container into the production module according to one embodiment of the present invention.
Figure 14:
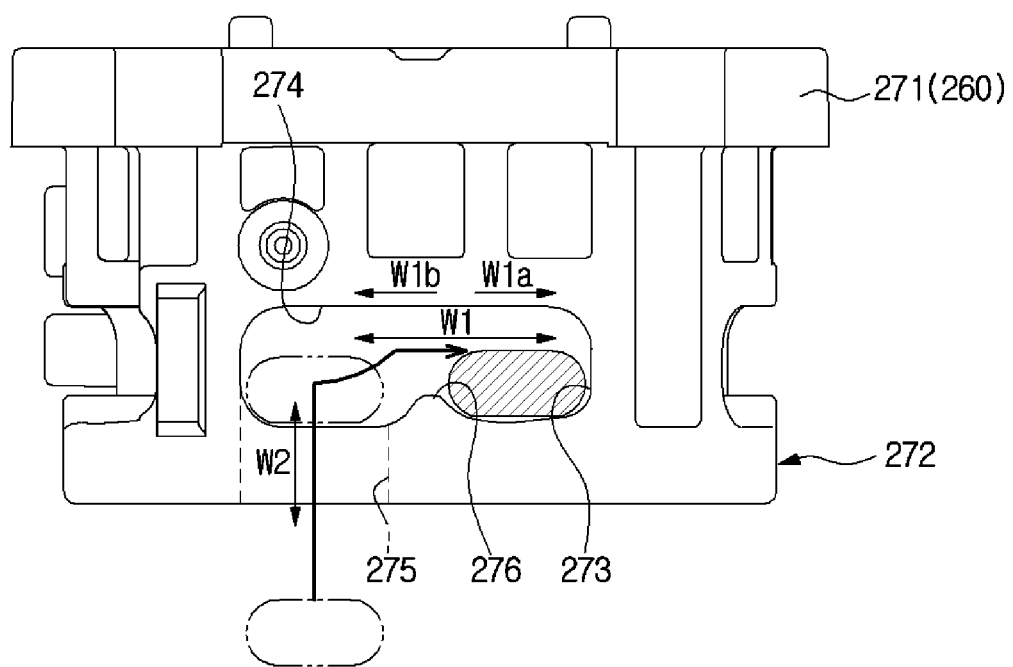
Figure 15:
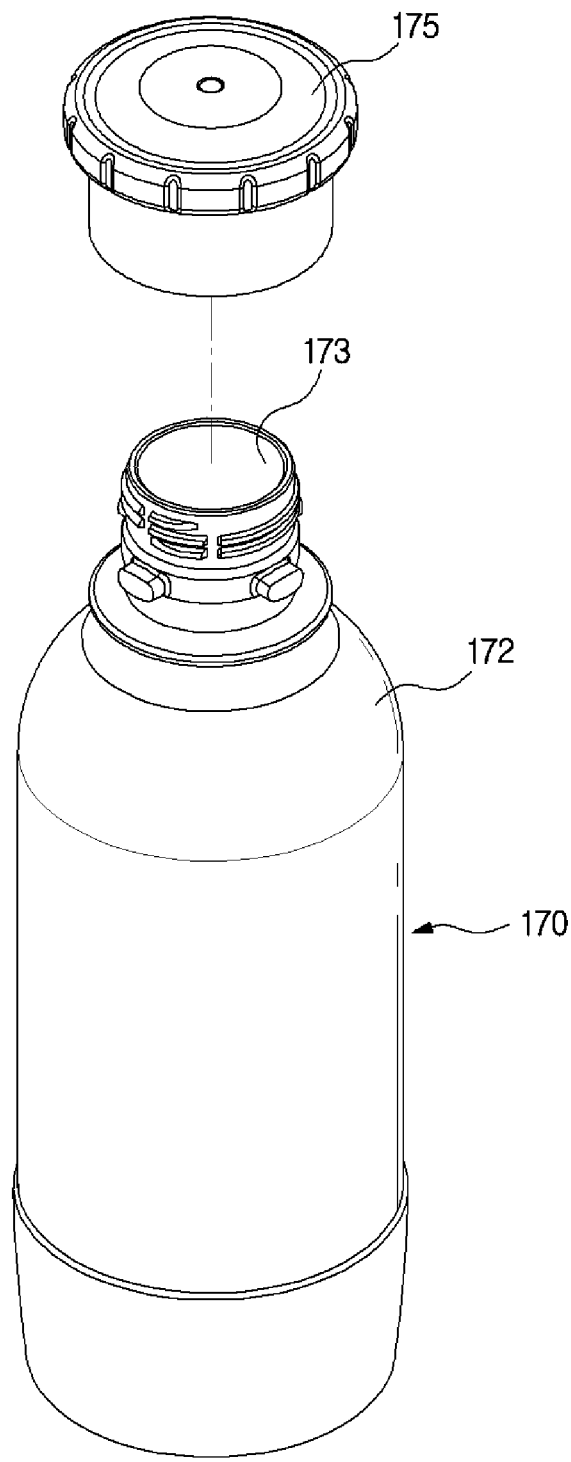
FIG. 15 is a view related to the carbonated water container according to one embodiment of the present invention.
Figure 16:
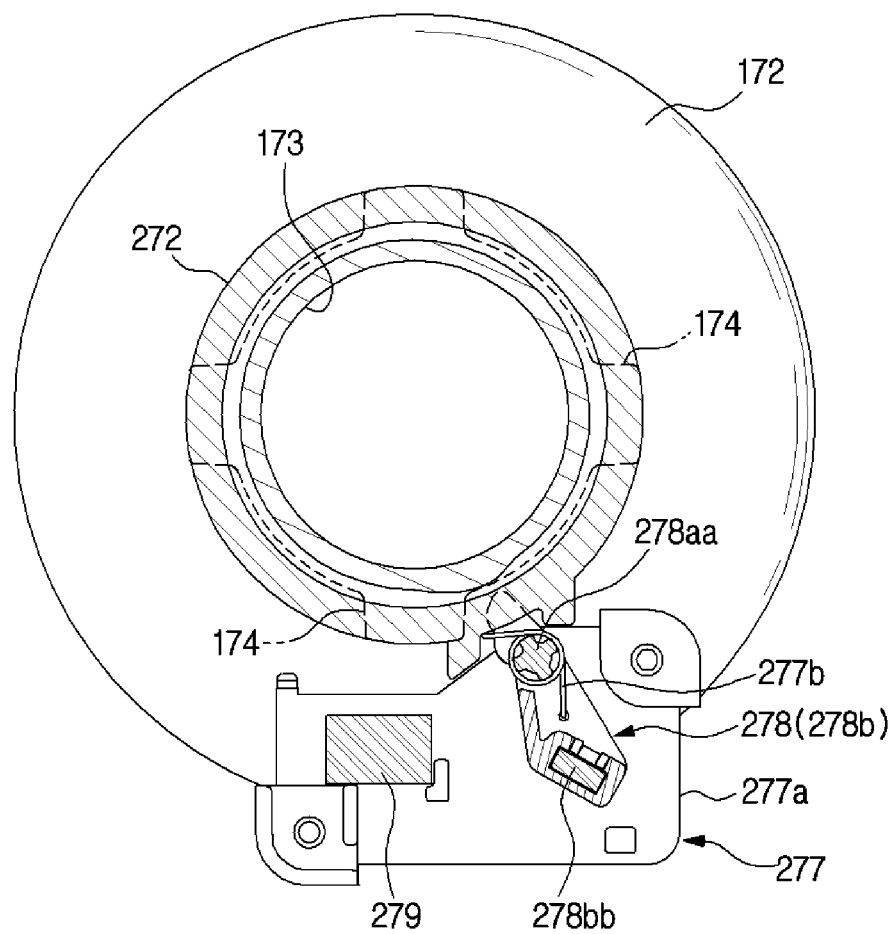
FIG. 16 is a view related to an installation of the carbonated water container and an installation sensor according to one embodiment of the present invention.

FIGS. 13 and 14 are views related to an installation of the carbonated water container into the production module according to one embodiment of the present invention, FIG. 15 is a view related to the carbonated water container according to one embodiment of the present invention, and FIG. 16 is a view related to an installation of the carbonated water container and an installation sensor according to one embodiment of the present invention.

The production module body 260 may include the installation body 272 in which the carbonated water container 170 installed, and the installation sensor 277.

The carbonated water container 170 is provided to be installed in the installation body 272 and is configured to be separable from the installation body 272. The water-dispensing space 132 may be provided to be exposed to an outside of the refrigerator main body, and the installation body 272 may be configured to be exposed in the water-dispensing space 132. Through this, the carbonated water container 170 is provided to be installable in the installation body 272 exposed in the water-dispensing space 132.

An operation in which the carbonated water container 170 is installed in the installation body 272 and an operation in which the installation sensor 277 senses an installation operation of the carbonated water container 170 may be performed together. By controlling such that carbonated water is produced when the carbonated water container 170 is installed in the installation body 272 through the installation sensor 277, safety of a production process of carbonated water may be improved.

The installation sensor 277 senses an operation in which the carbonated water container 170 is installed in the installation body 272, and when the carbonated water container 170 is installed in the installation body 272, a state where carbonated water can be produced is established. That is, since a carbonated water production is performed in the carbonated water container 170, as the installation sensor 277 senses whether the carbonated water container 170 is installed in the installation body 272, a state is determined whether carbonated water can be produced.

The carbonated water container 170 may include a container body 172 provided to have an inner portion capable of storing a liquid and an opening 173 provided at one side of the container body 172 such that the liquid is capable of flowing into or out from the container body 172. The carbonated water container 170 may include a seating protrusion 174 formed to protrude from the container body 172. The seating protrusion 174 may be configured to be adjacent to the opening 173. When the carbonated water container 170 is installed in the installation body 272, the carbonated water container 170 is provided to be seated while the opening 173 is inserted into the installation body 272 and the seating protrusion 174 is seated. The seating protrusion 174 is formed to protrude in a radial shape centralized by the opening 173. At least one of the seating protrusion 174 may be provided, For example, in the present embodiment, four seating protrusions 174 are provided in a predetermined interval.

Since the opening 173 of the carbonated water container 170 is formed in approximately a circular shape, the installation body 272 may be formed in a cylindrical shape to correspond to the opening 173. However, a shape of the opening 173 of the carbonated water container 170 and a shape of the installation body 272 are not limited thereto, and it is sufficient for the installation body 272 to be provided to correspond to the shape of the opening 173 of the carbonated water container 170.

The carbonated water container 170 may be configured to be easy to separately carry after being separated from the installation body 272. To this end, the carbonated water container 170 may include a container cover 175 capable of opening/closing the opening 173 (see FIG. 15).

The installation body 272 may include a seating portion 273 on which the seating protrusion 174 is seated and a guide rail 274 which guides the seating protrusion 174 to the seating portion 273.

The seating portion 273 is provided to correspond to a shape of the seating protrusion 174. The guide rail 274 is formed to extend from the seating portion 273 and is configured such that the seating protrusion 174 is movable to the seating portion 273 along the guide rail 274.

The installation body 272 may be provided in a cylindrical shape, and the guide rail 274 may be formed in a circumferential direction along a circumference of the installation body 272. Specifically, when a direction of a circumference of the installation body 272 is referred to as a first direction, the guide rail 274 is provided to be formed to extend in the first direction to the seating portion 273. The guide rail 274 may be lengthily formed in a first direction. The first direction may include a separation direction and an installation direction. The installation direction is a direction in which the seating protrusion 174 moves toward the seating portion 273 along the guide rail 274, and the separation direction is a direction in which the seating protrusion 174 moves away from the seating portion 273 along the guide rail 274. For example, the installation direction is defined as the clockwise direction, and the separation direction is defined as the counterclockwise direction based on a direction of facing the opening 173 of the carbonated water container 170. However, it is not limited thereto, and by varying a structure, it is not a problem to define the installation direction as the counterclockwise direction, and the separation direction as the clockwise direction. In the present embodiment, for example, since four seating protrusions 174 are provided, four guide rails 274 and four seating portions 273 each are provided in a predetermined interval.

The installation body 272 may include an insertion groove 275.

The insertion groove 275 is provided such that the seating protrusion 174 may move to the guide rail 274 when the carbonated water container 170 is inserted in the installation body 272. The insertion groove 275 is formed to extend from the guide rail 274 in the second direction that is perpendicular to the first direction.

The installation body 272 may include a separation prevention protrusion 276.

The separation prevention protrusion 276 may be formed on a movement path of the seating protrusion 174 in the guide rail 274. The separation prevention protrusion 276 is provided adjacent to the seating portion 273 to prevent the seating protrusion 174 positioned on the seating portion 273 from separating from the seating portion 273. Specifically, the separation prevention protrusion 276 is formed on the movement path of the seating protrusion 174 in the guide rail 274 and is disposed to be separated from the seating portion 273 in the separation direction.

The installation sensor 277 is provided to sense whether the carbonated water container 170 is installed in the installation body 272. Specifically, the installation sensor 277 is provided to sense that the seating protrusion 174 moves to the seating portion 273 along the guide rail 274 of the installation body 272.

The installation sensor 277 may include a sensing lever 278 and a sensor portion 279.

The sensing lever 278 may be rotatably provided. Specifically, the sensing lever 278 may be provided to be rotatable about a sensing lever central shaft 278aa and may have one side which is pressed by the seating protrusion 174 to rotate. The sensing lever 278 is provided to move between a non-installation position 278b corresponding to a position in which the seating protrusion 174 is positioned on the guide rail 274 and an installation position 278a corresponding to a position in which the seating protrusion 174 moves through the guide rail 274 to be positioned at the seating portion 273.

The installation sensor 277 may include an elastic recovery member 277b. When the carbonated water container 170 is separated from the installation body 272, the elastic recovery member 277b is provided such that the sensing lever 278 returns from the installation position 278a to the non-installation position 278b.

The sensor portion 279 is provided to sense a rotation of the sensing lever 278. The sensor portion 279 is provided to correspond to the other end of the sensing lever 278 to sense the rotation of the sensing lever 278.

A magnetic 278bb is provided at the other end of the sensing lever 278, and the sensor portion 279 may include a reed switch provided to sense the magnetic of the sensing lever 278. As a different embodiment, the sensor portion 279 may include, for example, a micro switch which is opened/closed by being pressed by the other side of the sensing lever 278.

The installation sensor 277 may include a sensor housing 277a. The sensor housing 277a may be provided such that the sensing lever 278 and the sensor portion 279 are not exposed to the outside. In addition, the sensor lever and the sensor portion 279 are provided to prevent a malfunction due to purified water.

When the carbonated water container 170 is installed in the installation body 272, the opening 173 of the carbonated water container 170 may be sealed by the production module 250. In this case, the opening 173 of the carbonated water container 170 may also be sealed by the production module body 260 or may also be sealed by a separate component.

For example, the production module 250 may include a packing portion 271a to seal the opening 173 of the carbonated water container 170. The packing portion 271a may be disposed in the installation body 272 to correspond to the opening 173 of the carbonated water container 170. When the carbonated water container 170 is installed in the installation body 272, the packing portion 271a may seal the opening 173 to prevent carbonated water from leaking through the opening 173.

Figure 17:
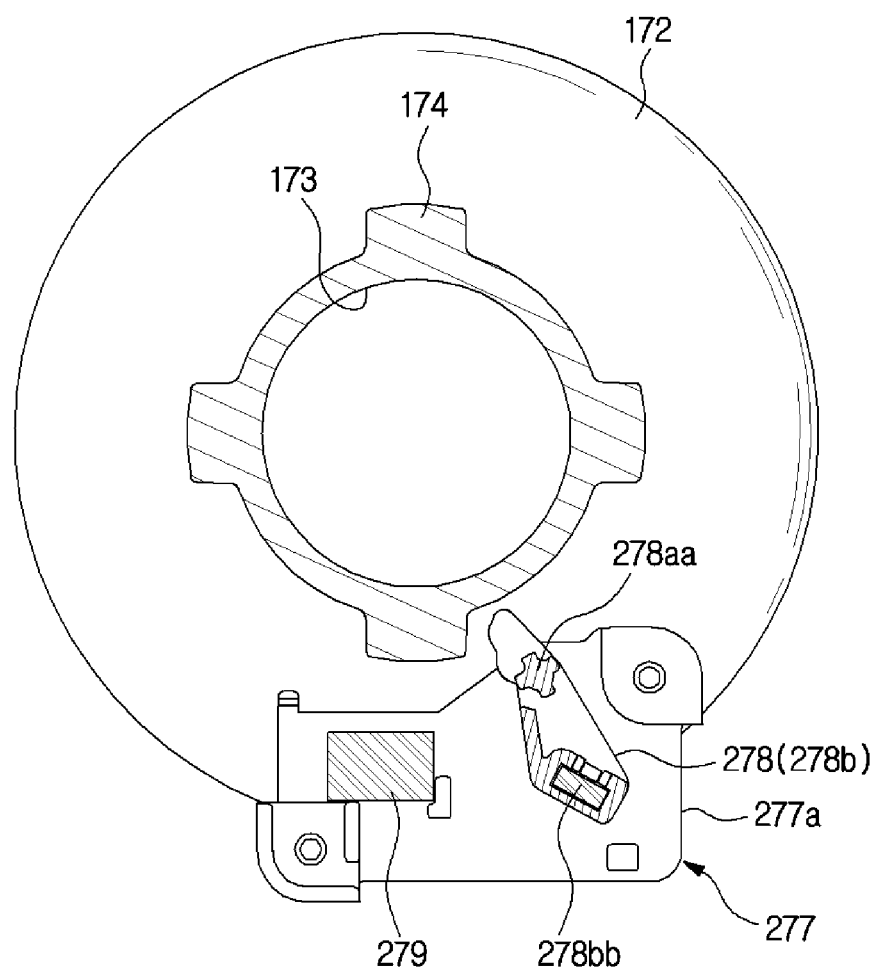
FIGS. 17, 18, and 19 are views related to installation of the carbonated water container and an operation of the installation sensor according to one embodiment of the present invention.
Figure 18:
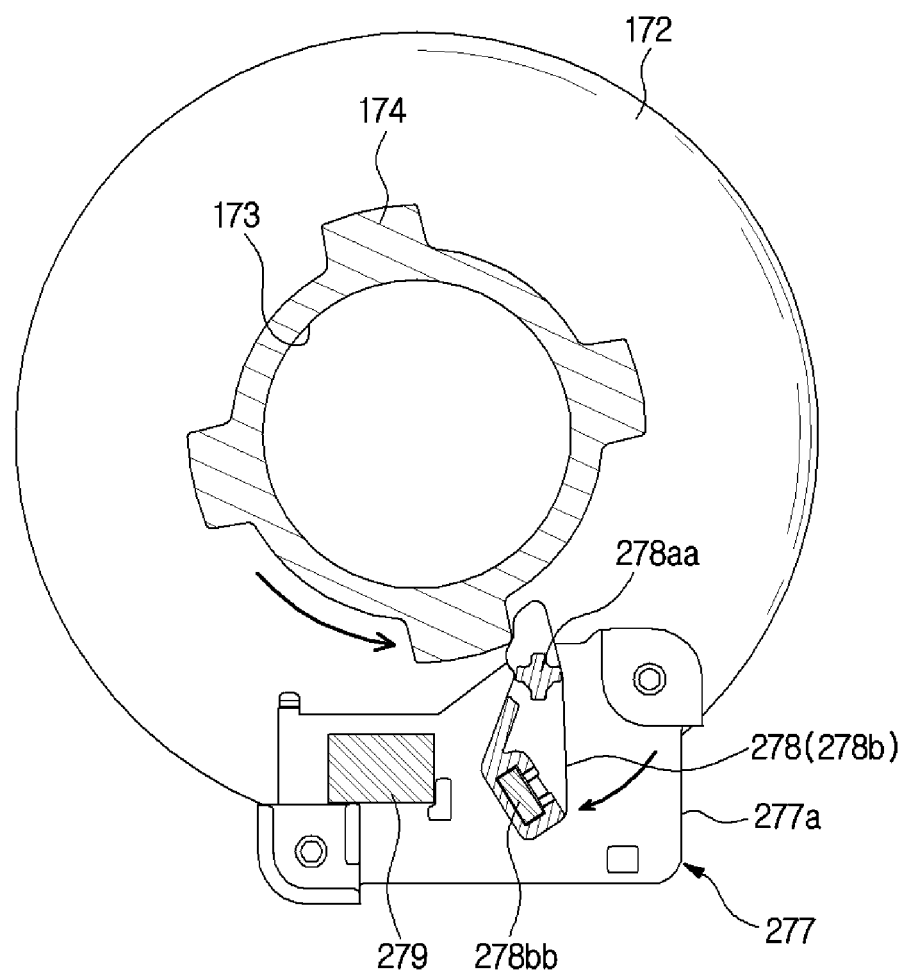
Figure 19:
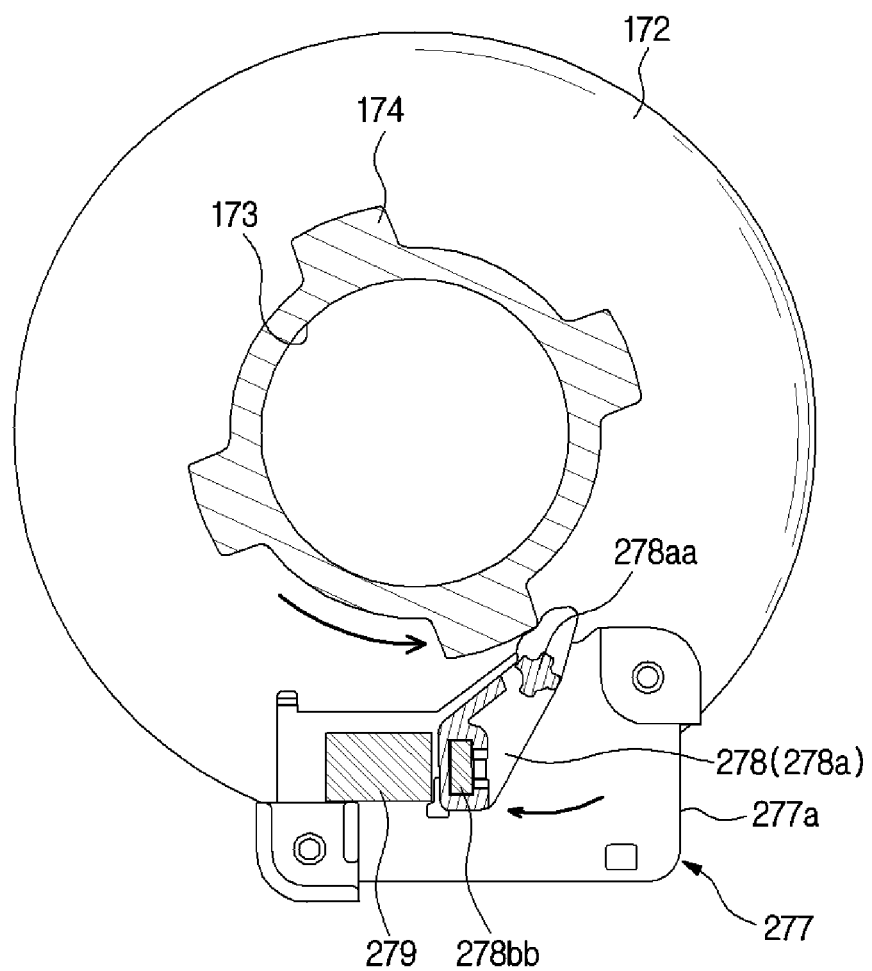

FIGS. 17, 18, and 19 are views related to installation of the carbonated water container and an operation of the installation sensor according to one embodiment of the present invention An operation in which the carbonated water container 170 is installed in the production module 250 will be described with reference to FIGS. 17 to 19.

The carbonated water container 170 is installed in the installation body 272 exposed in the water-dispensing space 132.

The seating protrusion 174 of the carbonated water container 170 is inserted in the guide rail 274 along the insertion groove 275.

After the carbonated water container 170 is inserted in the installation body 272 such that the seating protrusion 174 is positioned on the guide rail 274, the carbonated water container 170 is rotated in the installation direction. In this case, the seating protrusion 174 moves in the installation direction along the guide rail 274 and is positioned on the seating portion 273, and the carbonated water container 170 is installed in the installation body 272.

At the same time, the sensing lever 278 of the installation sensor 277 moves to the installation position 278a by being pressed by the seating protrusion 174 at the non-installation position 278b and senses that the carbonated water container 170 is installed in the production module 250. In addition, the opening 173 of the carbonated water container 170 is provided to be sealed by the production module body 260.

After the carbonated water container 170 is installed in the production module 250, purified water is supplied to the inner portion of the carbonated water container 170, carbon dioxide is sprayed, and carbonated water is produced. Specifically, when the carbonated water container 170 is stably installed in the production module 250, the carbonated water container 170 enters a state in which carbonated water can be produced. Such a state in which the carbonated water can be produced may be displayed through the user interface 40. Next, when a user select a carbonated water production, water is supplied to the carbonated water container 170, and carbon dioxide is supplied according to a requested carbonated water concentration of a user.

When the carbonated water container 170 is incorrectly installed in the installation body 272, the seating protrusion 174 is not inserted in the guide rail 274. When the seating protrusion 174 is not seated on the seating portion 273, since the installation sensor 277 is maintained in the non-installation position 278b, carbonated water is not produced in the carbonated water container 170.

Through this, when the carbonated water container 170 is incorrectly installed or uninstalled, a production of carbonated water is prevented, and thus safety of production may be improved.

An operation of separating the carbonated water container 170 from the production module 250 after carbonated water is produced in the carbonated water container 170 will be described.

The carbonated water container 170 is rotated in the separation direction such that the seating protrusion 174 of the carbonated water container 170 is moved from the seating portion 273 along the guide rail 274. Next, the carbonated water container 170 and the production module 250 are separated from each other such that the seating protrusion 174 passes the insertion groove 275 from the guide rail 274 and gets out from the installation body 272.

With this, the pressure from the seating protrusion 174 is released, and the sensing lever 278 of the installation sensor 277 moves from the installation position 278a to the non-installation position 278b.

Figure 20:
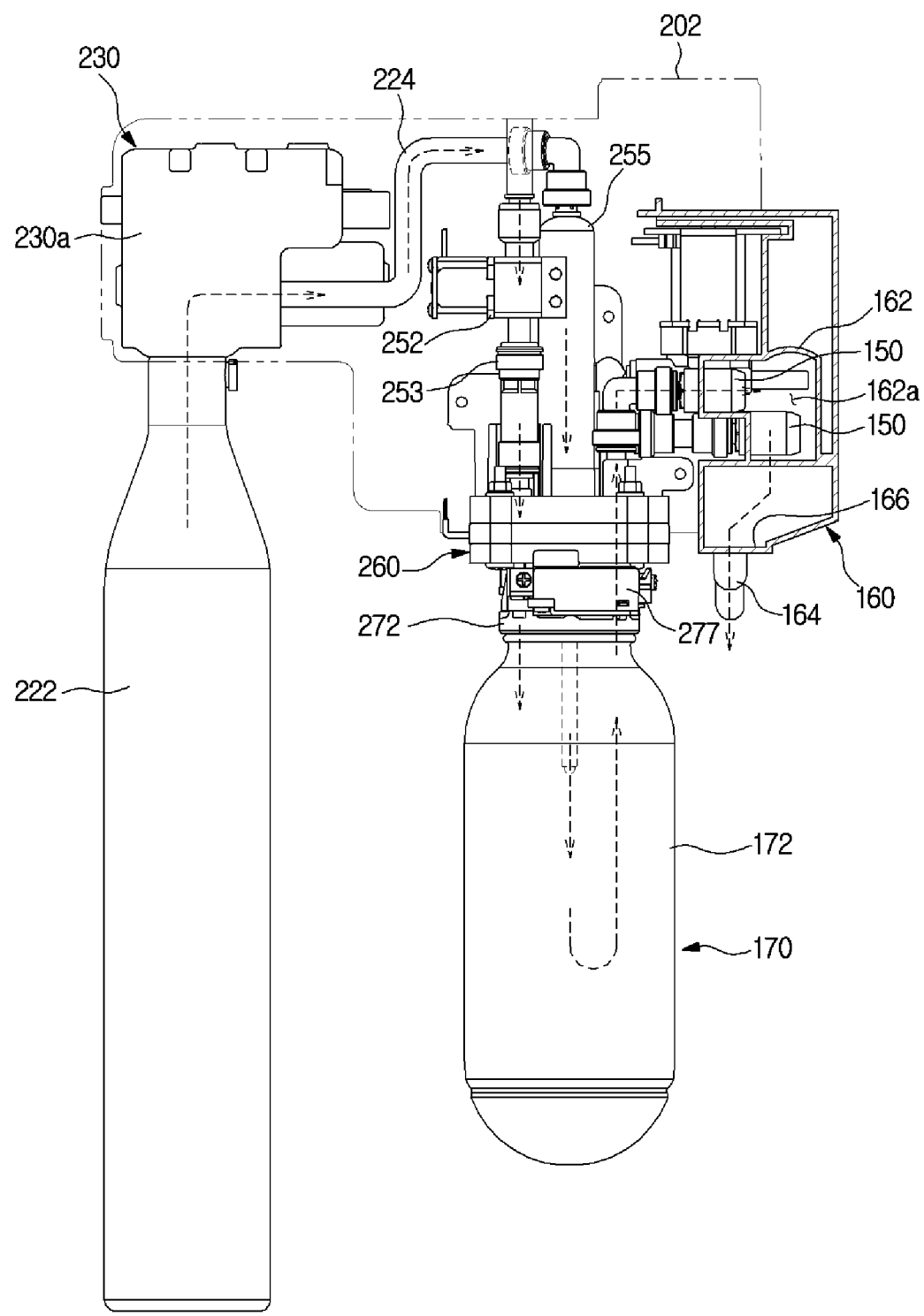
FIG. 20 is a view related to flow of carbon dioxide and flow of purified water in the production module and a discharge module according to one embodiment of the present invention.
Figure 21:
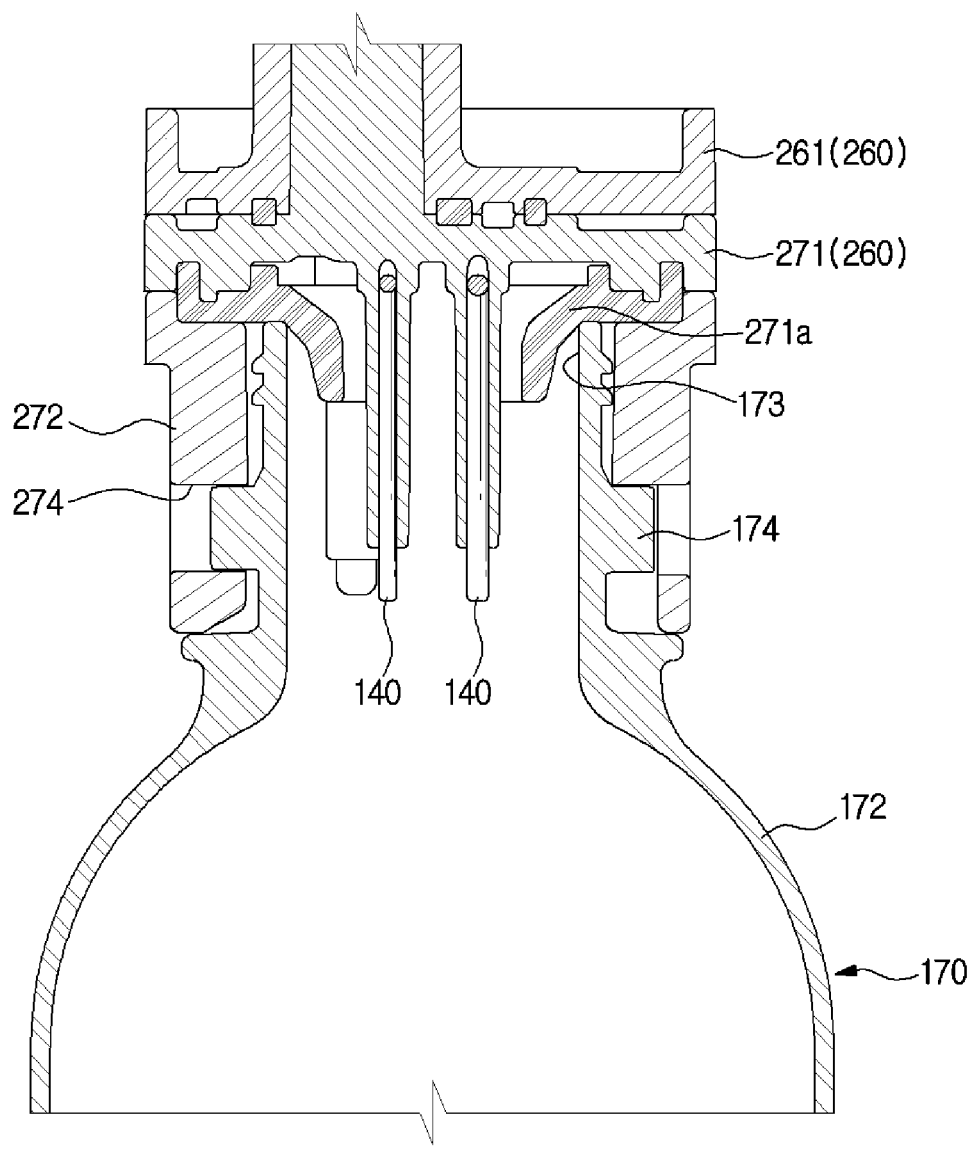
FIG. 21 is a view related to arrangements of the production module and an overflow sensor according to one embodiment of the present invention.
Figure 22:
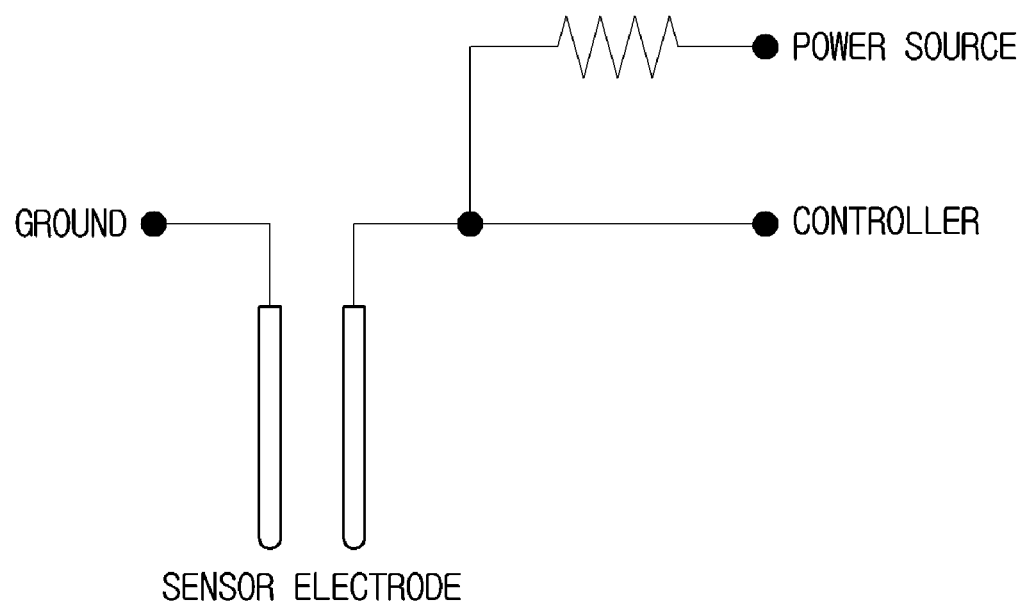
FIG. 22 is a view simply illustrating the overflow sensor according to one embodiment of the present invention.
Figure 23:
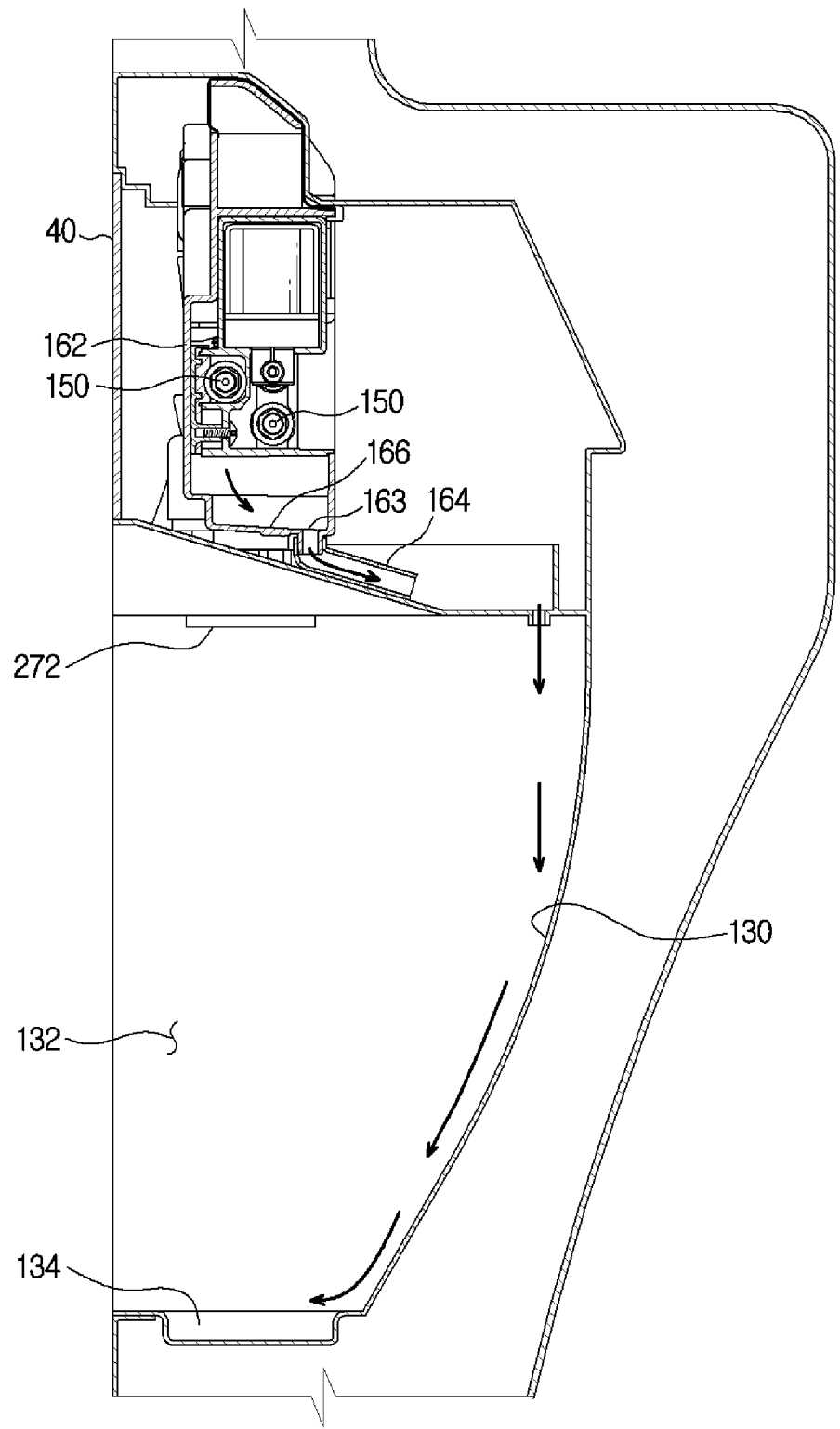
FIGS. 23 and 24 are views related to flow of a discharging fluid in the discharge module according to one embodiment of the present invention.
Figure 24:
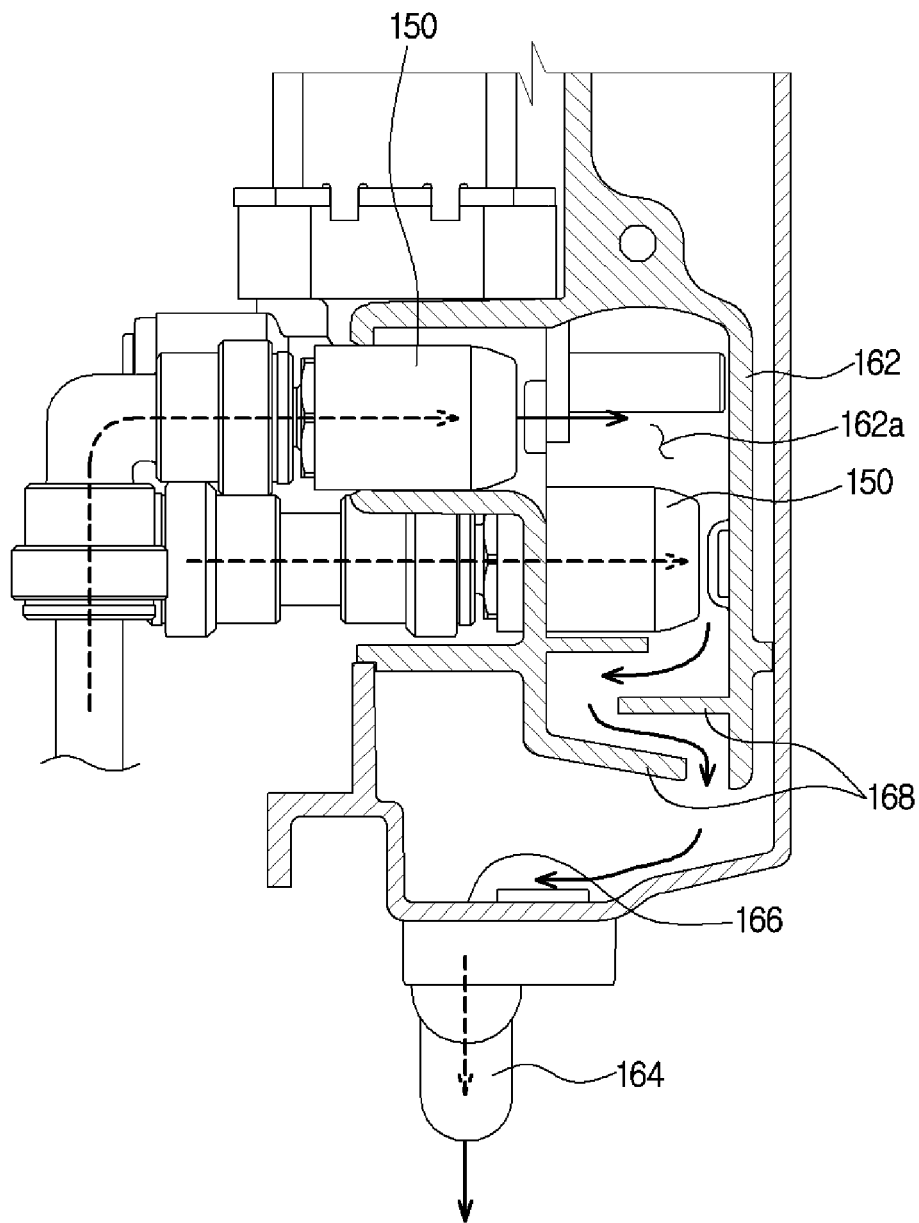

FIG. 20 is a view related to a flow of carbon dioxide and a flow of purified water in the production module and a discharge module according to one embodiment of the present invention, FIG. 21 is a view related to an arrangement of the production module and an overflow sensor according to one embodiment of the present invention, FIG. 22 is a view simply illustrating the overflow sensor according to one embodiment of the present invention, and FIGS. 23 and 24 are views related to a flow of a discharging fluid in the discharge module according to one embodiment of the present invention.

Carbonated water is produced by purified water being supplied and carbon dioxide being sprayed into the carbonated water container 170. However, since the carbonated water container 170 has a predetermined internal capacity, when purified water of more than the internal capacity flows into or carbonated of more than the internal capacity is produced, the carbonated water container 170 overflows.

The carbonated water production assembly 200 may include an overflow sensor 140.

The overflow sensor 140 is provided to sense whether purified water or carbonated water in the carbonated water container 170 is greater than a predetermined amount. A shape of the overflow sensor 140 is not limited, and it is sufficient for the overflow sensor 140 to sense whether purified water or carbonated water in the carbonated water container 170 is greater than a predetermined amount.

This will be described with reference to FIG. 22 as an example. The overflow sensor 140 is provided to include a pair of electrodes where one of the pair of electrodes is provided to be connected to the ground and the other is provided to be connected to a power source and a control portion. When the pair of electrodes do not come into contact with purified water, a voltage at the power source becomes an input voltage at the control portion. However, when the pair of electrodes come into contact with purified water, since the power source and the ground are electrically connected with each other, the input voltage at the control portion becomes less than the input voltage at the control portion in a case when the pair of electrodes do not come into contact with the purified water.

When the overflow sensor 140 senses an overflow of the carbonated water container 170, water supply is stopped.

The discharge module 160 is provided to discharge overflowing carbonated water to the outside when more carbonated water is produced than the internal capacity of the carbonated water container 170 during production of the carbonated water in the carbonated water container 170.

Overflowing carbonated water from the carbonated water container 170 may be discharged to an outside of the carbonated water container 170 through the relief valve 150. The carbonated water or a high pressure carbon dioxide gas discharged from the relief valve 150 is provided to flow into the discharge module 160.

The discharge module 160 is provided such that overflowing carbonated water or carbon dioxide is discharged from the carbonated water container 170 by detouring the carbonated water container 170. The discharge module 160 may be provided to surround the discharge portion of the relief valve 150.

The discharge module 160 may include a discharge module body 162 and a discharge hole 163. The discharge module body 162 is provided to surround the discharge portion of the relief valve 150 such that purified water, carbonated water, or high pressure carbon dioxide discharged from the discharge portion of the relief valve 150 flows in the discharge module body 162. Specifically, the discharge portion of the relief valve 150 is provided to be positioned at a discharge space 162a formed in the discharge module body 162.

The discharge hole 163 is provided toward a rear surface of the dispenser housing 130. Specifically, the discharge module 160 may include a discharge pipe 164 connected to the discharge hole 163. The discharge pipe 164 is provided to guide a discharging fluid such as purified water, carbonated water or carbon dioxide discharged from the discharge hole 163 to discharge to an outside of the discharge module 160. That is, one end of the discharge pipe 164 is provided to be connected to the discharge hole 163, and the other end is provided toward the rear surface of the dispenser housing 130, and thus the discharging fluid is provided to discharge at the rear surface of the dispenser housing 130.

The discharge hole 163 is provided toward the rear surface of the dispenser housing 130 such that a discharging liquid discharged from the discharge hole 163 flows along the rear surface of the dispenser housing 130 to the water collecting case 134.

Through this, since overflowing purified water or carbonated water is collected in the water collecting case 134 without influencing the carbonated water container 170, cleanliness and property of product may be improved.

The discharge module body 162 may include a discharge bottom portion 166 forming a lower portion. The discharge bottom portion 166 is provided to be adjacent to the discharge hole 163 and is formed to be inclined toward the discharge hole 163. Through such a structure, a discharging liquid such as purified water or carbonated water flowing into the discharge module body may be easily discharged from the discharge bottom portion 166 to the discharge hole 163.

The discharge module 160 may include a plurality of discharge ribs 168 provided in the discharge module body 162 and forming a discharge flow path such that a discharging liquid discharged from the relief valve 150 flows to the discharge bottom portion 166.

The plurality of discharge ribs 168 are provided to be formed between the discharge space 162*a* and the discharge bottom portion 166. A discharging liquid discharged to the discharge space 162*a* passes the plurality of discharge ribs 168 and flows to the discharge bottom portion 166. A discharging liquid discharged to the discharge space 162*a* may be provided to sequentially pass the plurality of discharge ribs 168.

The plurality of discharge ribs 168 may be disposed to be alternating with each other. That is, the plurality of discharge ribs 168 may be disposed to intersect each other. Due to this, a discharge noise generated from the discharge space 162*a* and transmitted to the discharge bottom portion 166 may be reduced by the plurality of discharge ribs 168.

Due to the plurality of discharge ribs 168 disposed alternatingly with each other, the discharge flow path formed by the plurality of discharge ribs 168 is formed in a zigzag shape. As the discharge flow path is formed in the zigzag shape, a discharging liquid may be prevented from flowing backward from the discharge bottom portion 166. In addition, since the discharge flow path is formed in the zigzag shape by the plurality of discharge ribs 168, the length of the discharge flow path may be greater than that of a case when the plurality of discharge ribs 168 are not provided. Through this, since a distance over which a noise generated while a discharging liquid is being discharged from the relief valve 150 is transmitted, is lengthened, a discharging noise may be reduced.

That is, the plurality of discharge ribs 168 are provided to block the direct transmission of the discharging noise generated from the relief valve 150, a movement distance of the noise transmitted through the discharge flow path may be lengthened by the plurality of discharge ribs 168, and thus the discharging noise may be reduced. At least a part of the discharge ribs 168 of the plurality of discharge ribs 168 may be formed to be inclined. Through such a structure, a discharging liquid discharged to the discharge space 162*a* may easily flow to the discharge bottom portion 166. In addition, through such a structure, a discharging liquid may be effectively prevented from flowing backward from the discharge bottom portion 166.

Figure 25:
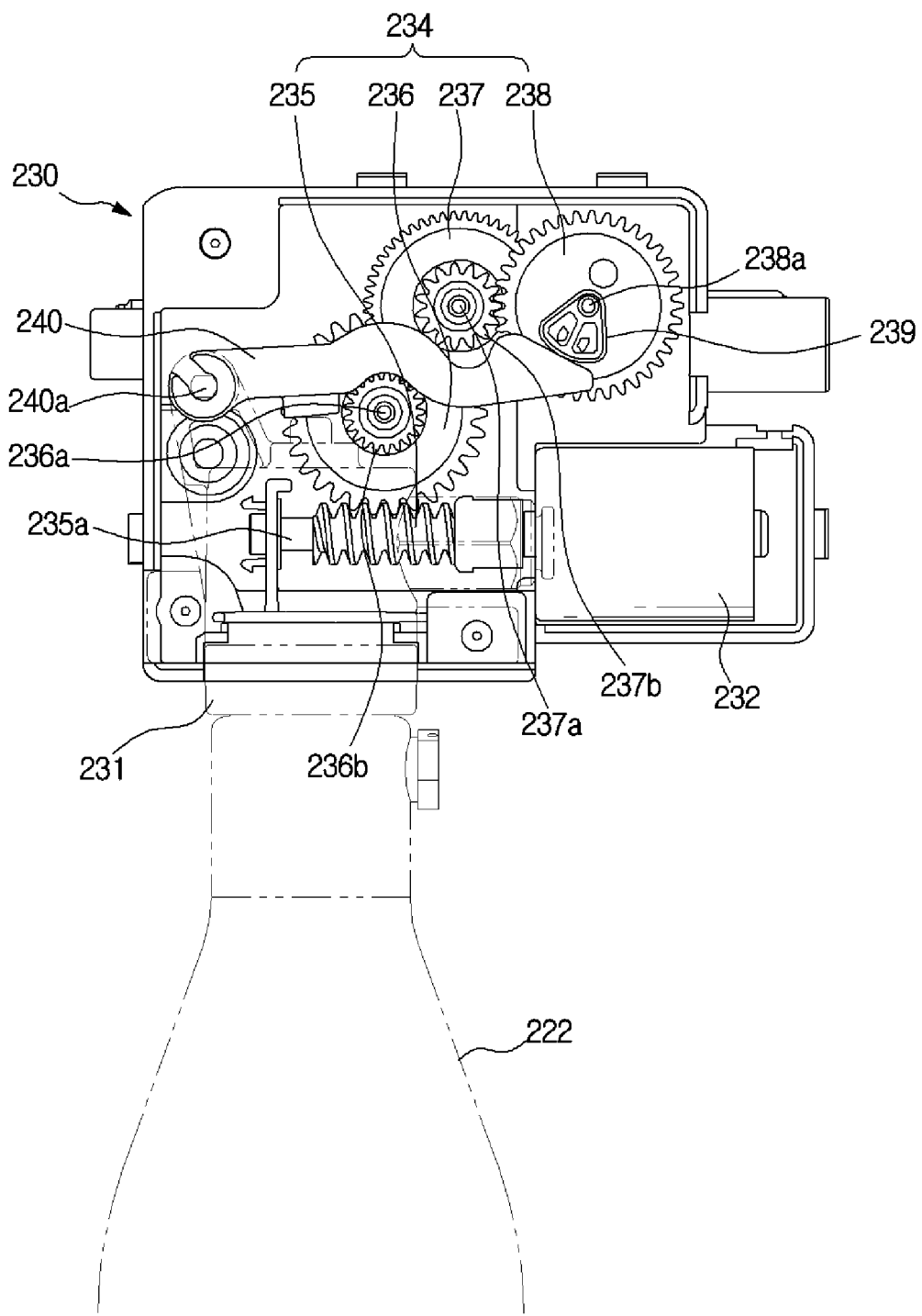
FIGS. 25 and 26 are view related to a carbon dioxide supply valve according to one embodiment of the present invention.
Figure 26:
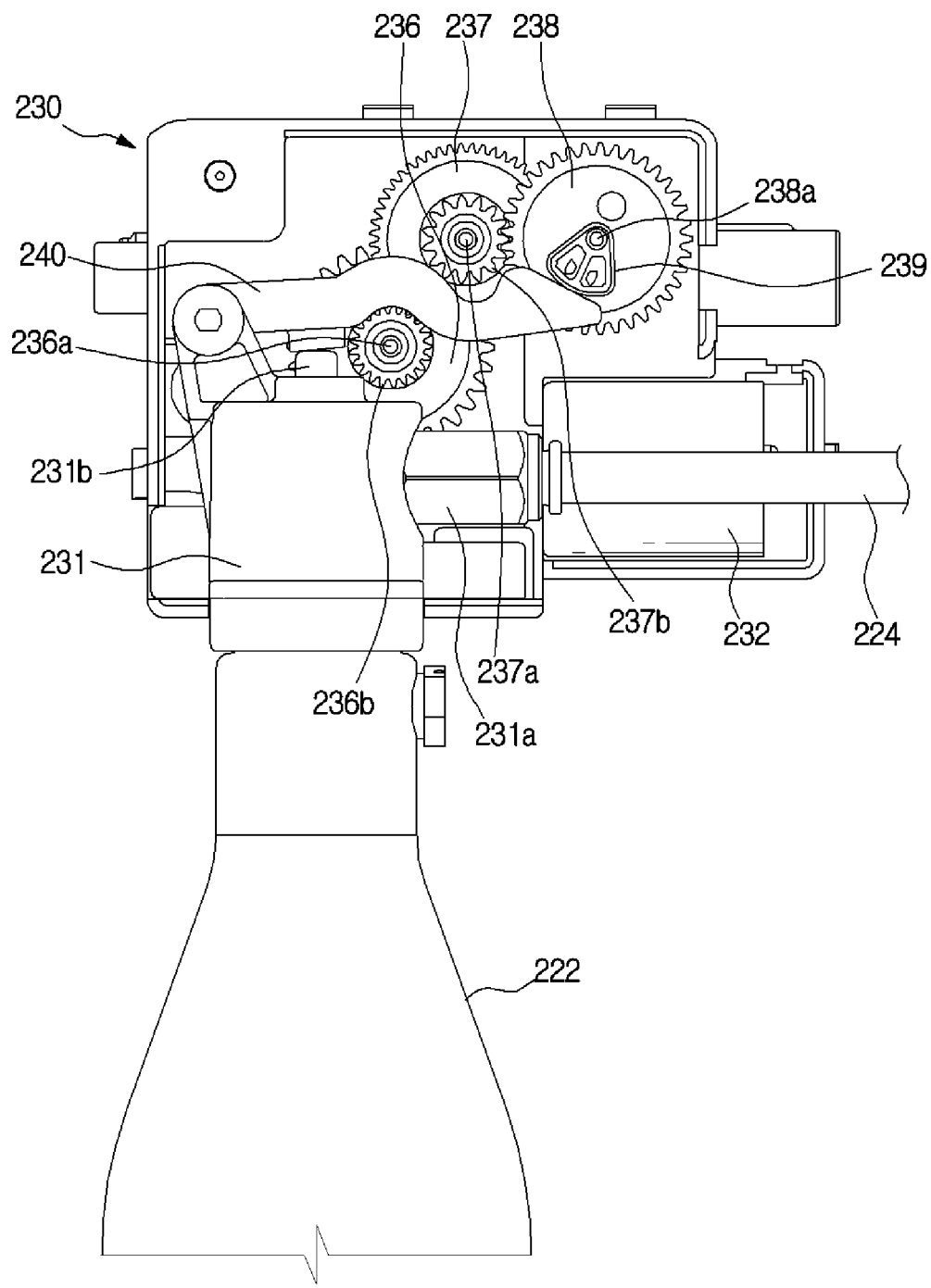

FIGS. 25 and 26 are view related to a carbon dioxide supply valve according to one embodiment of the present invention.

The carbon dioxide supply valve 230 is provided to supply carbon dioxide from the carbon dioxide cylinder 222 to the production module 250.

The carbon dioxide supply module 220 is provided to adjust an amount of carbon dioxide discharged from the carbon dioxide cylinder 222 through the carbon dioxide supply valve 230. By adjusting an amount of carbon dioxide transmitted through the carbon dioxide supply valve 230 from the carbon dioxide cylinder 222 to the production module 250, the concentration of carbonated water may be adjusted.

Of course, since the carbon dioxide supply module 220 may also be configured to include a regulator (not shown) which depressurizes carbon dioxide discharged from the carbon dioxide cylinder 222, by supplying depressurized carbon dioxide to the production module 250, concentration of carbonated water may be adjusted.

The carbon dioxide supply valve 230 includes a cylinder connector 231, a carbon dioxide supply motor 232, and a supply gear portion 234.

The cylinder connector 231 is provided to be capable of coupling to the carbon dioxide cylinder 222. The cylinder connector 231 may be installed at an exit of carbon dioxide in the carbon dioxide cylinder 222. The cylinder connector 231 may include a carbon dioxide discharge pipe 231*a* through which carbon dioxide is discharged, and a carbon dioxide discharge button 231*b* for controlling discharge of carbon dioxide of the carbon dioxide cylinder 222.

When the carbon dioxide discharge button 231*b* is pressed, carbon dioxide stored in the carbon dioxide cylinder 222 is discharged to the carbon dioxide discharge pipe 231*a*. In addition, when the carbon dioxide discharge button 231*b* is not pressed, carbon dioxide stored in the carbon dioxide cylinder 222 is not discharged.

The carbon dioxide supply motor 232 generates a turning force for pressing the carbon dioxide discharge button 231*b* of the cylinder connector 231.

The supply gear portion 234 is provided to receive a turning force from the carbon dioxide supply motor 232 and to press the carbon dioxide discharge button 231*b*.

The supply gear portion 234 includes a worm gear 235 and a worm wheel 236. The worm gear 235 receives a turning force from the carbon dioxide supply motor 232 rotates about a worm gear rotation shaft 235*a*. Teeth which have a spiral form is formed in a circumferential surface of the worm gear 235 for supplying a turning force to the worm wheel 236.

The worm wheel 236 receives a turning force from the worm gear 235, and rotates about a worm gear rotation shaft 236*a*. The teeth having a spiral form is formed on the circumferential surface of the worm wheel 236 to receive a turning force from the worm gear 235.

The supply gear portion 234 may include at least one speed reduction gear provided to correspond to the worm wheel 236. At least one speed reduction gear is provided to reduce rotational speed of the worm wheel 236 using a gear ratio. At least one speed reduction gear may be provided, and for the sake of convenience in the description, a pair thereof are provided and will be described. These are each described as a first speed reduction gear 237 and a second speed reduction gear 238.

The worm wheel 236 includes an inner side worm wheel 236*b* having a circumferential surface less than the circumferential surface of the worm wheel 236 and formed integrally. The first speed reduction gear 237 receives a turning force from the inner side wheel 236*b* and rotates about the first speed reduction gear rotation shaft 237*a*.

The first speed reduction gear 237 includes a first inner speed reduction gear 237*b* having a circumferential surface less than the circumferential surface of the first speed reduction gear 237 and formed integrally. The second speed reduction gear 238 receives a turning force from the first inner speed reduction gear 237*b* and rotates about the second speed reduction gear rotation shaft 238*a*.

Through this process, rotational speed of the worm gear 235 is decreased while being transmitted to the second speed reduction gear 238.

The supply gear portion 234 may include an eccentric rotation member 239. The eccentric rotation member 239 is provided to be formed at one side of the gear and rotate with the gear. Although arrangement of the eccentric rotation member 239 is not limited, the eccentric rotation member 239 may be formed at one side of the second speed reduction gear 238 in the present embodiment. However, it is not limited thereto, and the eccentric rotation member 239 may be formed in the worm wheel 236 when the speed reduction gear is omitted.

While the eccentric rotation member 239 is rotating, a distance between an outer surface of the supply lever 240 in contact with the circumferential surface and the rotation shaft varies.

The carbon dioxide supply valve 230 may include a supply lever 240. One end of the supply lever 240 is provided to be rotatable about the supply lever rotation shaft 240a, and the other end is provided to be operated by the eccentric rotation member 239.

Through such a structure, while the eccentric rotation member 239 is rotating, the supply lever 240 comes into contact with the eccentric rotation member 239 and rotates about the supply lever rotation shaft 240a. The supply lever 240 may press the carbon dioxide discharge button 231b of the cylinder connector 231 or release the pressure using change of the distance between the outer surface of the supply lever 240 in contact with a circumferential surface of the eccentric rotation member 239 and a second speed reduction gear rotation shaft 238a while the eccentric rotation member 239 is rotating as described above.

Specifically, when an outer surface portion of the supply lever 240 in contact with the circumferential surface of the eccentric rotation member 239 is positioned at a position having a minimum distance from the second speed reduction gear rotation shaft 238a, the supply lever 240 does not press the carbon dioxide discharge button 231b. On the contrary, when the outer surface portion of the supply lever 240 in contact with the circumferential surface of the eccentric rotation member 239 is positioned at a position having a maximum distance from the second speed reduction gear rotation shaft 238a, the supply lever 240 presses the carbon dioxide discharge button 231b to discharge carbon dioxide through the carbon dioxide discharge pipe 231a.

As is apparent from the above description, the refrigerator according to the embodiment of the present invention can simplify the production module of carbonated water.

In addition, in the refrigerator according to the embodiment of the present invention, by maintaining a predetermined amount of carbonated water or carbon dioxide in a carbonated water container, property of a product can be improved.

In addition, in the refrigerator according to the embodiment of the present invention, by separating a production process and a discharge process of carbonated water, cleanness can be improved.

While the specific embodiment of the present invention has been illustrated and described above in detail, the invention is not limited by the embodiment and may be variously modified and changed by those skilled in the art without departing from the scope of the invention as defined by the following claims.

What is claimed is:

1. A refrigerator comprising:
   a refrigerator main body including a cooling space; and
   a carbonated water production assembly provided in the refrigerator main body,
   wherein the carbonated water production assembly includes:
   a production module;
   a carbon dioxide supply module connected to the production module to supply carbon dioxide;
   a carbonated water container which is provided to be detachable from the production module, and in which carbonated water is produced; and
   a discharge module provided to discharge a discharging fluid which overflows from the carbonated water container from the carbonated water container.

2. The refrigerator of claim 1, wherein the carbonated water container includes an opening having one open side, and the opening is sealed by the production module when the carbonated water container is installed in the production module.

3. The refrigerator of claim 1, wherein the carbonated water container is configured to be sealed by the production module, and the carbonated water production assembly further includes at least one relief valve which has one side facing the opening of the carbonated water container, and discharges a discharging fluid which overflows from the carbonated water container to the discharge module.

4. The refrigerator of claim 3, wherein the relief valve is provided to communicate with an inner portion of the carbonated water container when the carbonated water container is installed in the production module.

5. The refrigerator of claim 3, wherein the discharge module includes:
   a discharge module body provided to surround a discharge portion of the relief valve; and
   a discharge hole which discharges carbonated water discharged to the discharge module body to an outside of the discharge module.

6. The refrigerator of claim 5, wherein the carbonated water production assembly includes a dispenser housing forming a water dispensing space exposed to the outside, and the discharge hole is provided facing a rear surface of the dispenser housing.

7. The refrigerator of claim 5, wherein the discharge module further includes a discharge bottom portion provided at a lower portion of a discharge module body, and the discharge bottom portion is provided to be inclined toward the discharge hole.

8. The refrigerator of claim 5, wherein the discharge module further includes a plurality of discharge ribs which forms a discharge flow path such that a discharging fluid discharged from the relief valve flows to the discharge bottom portion.

9. The refrigerator of claim 8, wherein the discharge module further includes a discharging space connected to a discharge portion of the relief valve in the discharge module body, and the discharging space and the discharge bottom portion are connected to each other through the discharge flow path.

10. The refrigerator of claim 8, wherein the plurality of discharge ribs are disposed to alternately intersect with each other.

11. The refrigerator of claim 1, wherein the production module includes an installation body provided such that the carbonated water container is installable.

12. The refrigerator of claim 1, wherein the carbonated water production assembly includes a water dispensing space which is exposed to the outside, and in which the carbonated water container is accommodated, and the production module further includes an installation body in which the carbonated water container is installable, and which is exposed in the water dispensing space.

13. The refrigerator of claim 1, wherein the production module further includes a packing portion which seals the opening when the carbonated water container is installed in the production module.

14. The refrigerator of claim 1, wherein the carbonated water production assembly includes an overflow sensor which is provided to be inserted into the opening when the carbonated water container is coupled to the production module, and senses overflow of carbonated water in the carbonated water container.

15. The refrigerator of claim 1, wherein the discharge module is provided such that a discharging fluid which overflows from the carbonated water container is discharged from the carbonated water container by detouring.

16. A refrigerator comprising:
a refrigerator main body including a cooling space; and
a carbonated water production assembly provided in the refrigerator main body,
wherein the carbonated water production assembly includes:
a water dispensing space exposed at the refrigerator main body to the outside;
a production module having one side exposed in the water dispensing space;
a carbon dioxide supply module connected to the production module to supply carbon dioxide;
a carbonated water container which is detachably provided at one side of the exposed production module, and in which carbonated water is produced;
at least one relief valve provided in the production module to discharge carbonated water which overflows from the carbonated water container; and
a discharge module provided to discharge carbonated water discharged through the at least one relief valve by detouring the carbonated water container.

17. The refrigerator of claim 16, wherein the discharge module includes:

a discharge module body provided to surround a discharge portion of the relief valve; and
a discharge hole provided in the discharge module body to discharge carbonated water discharged from the relief valve to outside of the discharge module body.

18. The refrigerator of claim 17, wherein the carbonated water production assembly includes a dispenser housing forming a water dispensing space exposed to an outside of the refrigerator main body, and the discharge hole is provided facing a rear surface of the dispenser housing.

19. The refrigerator of claim 17, wherein the discharge module body includes a discharge bottom portion forming a lower portion, and the discharge bottom portion is provided to be inclined toward the discharge hole.

20. A refrigerator comprising:
a refrigerator main body including a cooling space; and
a carbonated water production assembly provided in the refrigerator main body,
wherein the carbonated water production assembly includes:
a water dispensing space provided to be exposed at the refrigerator main body to the outside;
a production module having one side exposed in the water dispensing space;
a purified water module configured to supply purified water and a carbon dioxide supply module configured to supply carbon dioxide, which are connected to the production module;
a carbonated water container which is detachably provided at one side of the exposed production module, receives purified water from the purified water module, and receives carbon dioxide from the carbon dioxide supply module, and in which carbonated water is produced; and
at least one relief valve provided such that a discharging fluid such as purified water, carbon dioxide, and carbonated water which overflow from the carbonated water container is discharged.

* * * * *